(12) United States Patent
Martin et al.

(10) Patent No.: US 11,608,409 B2
(45) Date of Patent: Mar. 21, 2023

(54) FABRICS WITH INTERPENETRATING POLYMER NETWORKS OF BREATHABLE ELASTOMERIC COMPOSITES FOR NANOSCALE DIFFUSION CONTROL AND PROTECTION

(71) Applicant: The Government of the United States of America, as represented by the Secretary of the Navy, Arlington, VA (US)

(72) Inventors: Brett D. Martin, Washington, DC (US); Jawad Naciri, Arlington, VA (US); Banahalli R. Ratna, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/703,693

(22) Filed: Mar. 24, 2022

(65) Prior Publication Data
US 2022/0213261 A1    Jul. 7, 2022

Related U.S. Application Data

(62) Division of application No. 16/860,330, filed on Apr. 28, 2020, now Pat. No. 11,299,582.

(60) Provisional application No. 62/839,843, filed on Apr. 29, 2019.

(51) Int. Cl.
C08G 61/12   (2006.01)
C08G 81/00   (2006.01)
H01B 1/12    (2006.01)

(52) U.S. Cl.
CPC .......... *C08G 61/126* (2013.01); *C08G 81/00* (2013.01); *H01B 1/127* (2013.01); *C08G 2261/122* (2013.01); *C08G 2261/126* (2013.01); *C08G 2261/514* (2013.01); *C08G 2261/70* (2013.01)

(58) Field of Classification Search
CPC   C08G 61/126; C08G 81/00; C08G 2261/122; C08G 2261/126; C08G 2261/514; C08G 2261/70; H01B 1/127
See application file for complete search history.

(56) References Cited

U.S. PATENT DOCUMENTS

| | | |
|---|---|---|
| 8,120,893 B2 | 2/2012 | Martin et al. |
| 8,931,114 B2 | 1/2015 | Martin et al. |
| 8,940,173 B2 | 1/2015 | Bakajin et al. |
| 9,095,821 B1 | 8/2015 | Ratto et al. |

OTHER PUBLICATIONS

An Elastomeric Poly(Thiophene-EDOT) Composite with a Dynamically Variable Permeability Towards Organic Vapors, B. D. Martin et al, Adv. Funct. Mater. (2012) 22, 3116-3127.

*Primary Examiner* — Shane Fang
(74) *Attorney, Agent, or Firm* — US Naval Research Laboratory; Roy Roberts

(57) ABSTRACT

An interpenetrating network (IPN) polymer membrane material includes a soft polyurethane interspersed with a crosslinked conducting polymer. The material can be reversibly "switched" between its oxidized and reduced states by the application of a small voltage, ~1 to 4 volts, thus modulating its diffusivity.

2 Claims, 26 Drawing Sheets

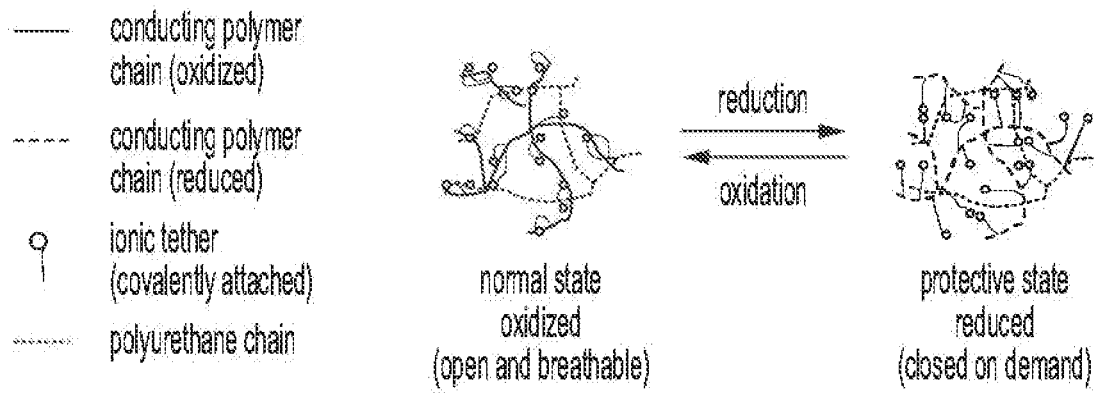
FIG. 1
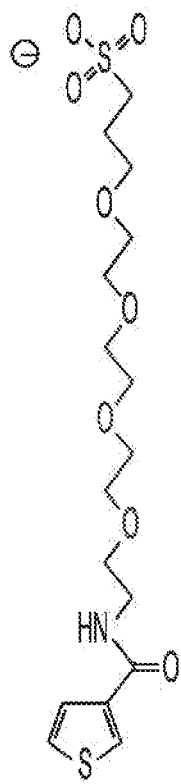 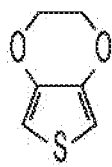 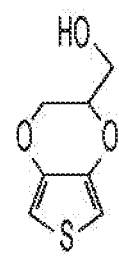
FIG. 2A    FIG. 2B    FIG. 2C

- FID quantifies the amount of vapor that permeated the sample

FABRICS WITH INTERPENETRATING POLYMER NETWORKS OF BREATHABLE ELASTOMERIC COMPOSITES FOR NANOSCALE DIFFUSION CONTROL AND PROTECTION

CROSS-REFERENCE TO RELATED APPLICATIONS

This application is related to U.S. Pat. Nos. 8,120,893 and 8,931,114.

This application claims the benefit as a division of U.S. patent application Ser. No. 16/860,330 filed on Apr. 28, 2020, the entirety of which is incorporated herein by reference.

BACKGROUND

New materials having nanoscale porosities that can be reversibly changed on command are of great interest in a variety of applications. In the area of chemical threat protection, they may have a major impact.

BRIEF SUMMARY

In one embodiment, a conductive polymer comprises poly(TP-CAE$_4$P—SO3-co-bis-EDOT-co-HM-EDOT).

In another embodiment, a material comprises an interpenetrating polymer network comprising net-(poly(TP-CAE$_4$P—SO$_3$-co-bis-EDOT-co-HM-EDOT)-co-(net-(poly (propylene glycol-tolylene 2,4 diisocyanate)))-ipn-(polyurethane).

In a further embodiment, a method of modulating the diffusivity of a material includes reducing the material to decrease its diffusivity and oxidizing the material to increase its diffusivity, wherein the material comprises a conductive polymer comprising poly(TP-CAE$_4$P—SO$_3$-co-bis-EDOT-co-HM-EDOT).

BRIEF DESCRIPTION OF THE DRAWINGS

FIG. 1 depicts the electroactive open-close behavior of the IPN.

FIGS. 2A-2C show the termonomers used in the synthesis of the tether-containing conducting polymer.

DETAILED DESCRIPTION

Definitions

Figure 3:
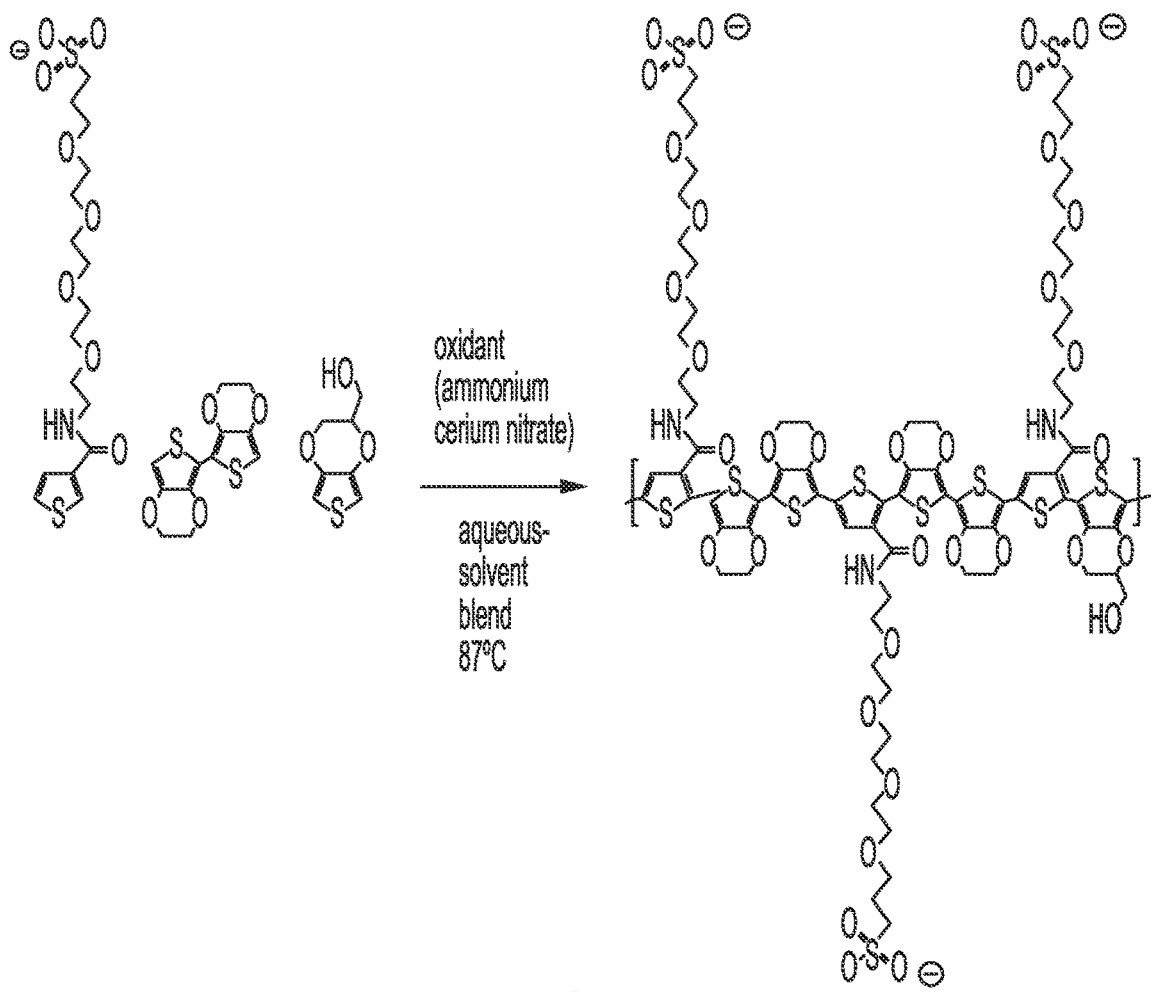
FIG. 3 illustrates an exemplary synthesis of poly(TP-CAE$_4$P—SO$_3$-co-bis-EDOT-co-HM-EDOT).

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Described herein is an interpenetrating network (IPN) polymer membrane material composed of soft polyurethane interspersed with a crosslinked conducting polymer. The material can be reversibly "switched" between its oxidized and reduced states by the application of a small voltage, ~1 to 4 volts. The conducting polymer network contains molecular tethers that each have a charged terminus. When the network is "switched," the polymer chain morphology is altered and the moveable tethers form ion-pairing complexes that either increase or decrease the material's nanoporosity. The material thus has an "open" state that has a relatively high porosity, and a "closed" state with a lowered porosity. Chemical protective clothing, or clothing sections, formed from it will have a high permeability to water vapor in the open state. This provides breathability and is thus comfortable for the wearer, and physical activity can be performed easily. However, if a chemical agent appears, application of the small voltage will rapidly "switch" the material to the closed state. When closed, the clothing will block or greatly diminish transport of the agent, as seen in FIG. 1. The closed state has a large degree of bistability—it is maintained for a period of days without need for voltage application.

The interpenetrating network (IPN) can be formed, with good adhesion, in common support fabrics such as wool or cotton/nylon. It can also be formed in commercially available electrically conducting fabrics such as those based on nanoporous absorptive carbon fibers or carbon nanotubes. The conducting fabrics enhance the switching ability of the IPN. Also, they can serve as a platform for wearable warfighter electronics such as sensors and communication devices.

When challenged with simulant vapor, the closed state IPN is able to block 99% of the vapor amount that had passed through while in an open state. When challenged again after three days, its performance was nearly identical. Thus the closed IPN is bistable for operationally significant time periods. The open state of the material has shown very high breathabilities, in terms of moisture vapor transport (grams water/square meter per day), that meets or exceeds those of state of the art commercial sport clothing. Also, at relative humidity of up to 50%, the closed state demonstrates a substantial breathability as well, more than one-half of that shown by the open state.

By casting a polymer solution the IPN can be formed within fabrics. This is expected to allow straight-forward manufacture and scale-up. The IPN forms through chemical crosslinking processes that occur when the solution is deposited. Use of selected solvents at moderate temperatures will allow other CB protective elements, for example an agent-degrading enzyme, to be introduced into the IPN during its formation IPN Synthesis FIG. 2 shows the termonomers used in the synthesis of the tether-containing conducting polymer, which is depicted in blue in FIG. 1.

In FIG. 2, the proper chemical name for termonomer (a) is (3-{2-[2-(2-{2-[(thiophene-3-carbonyl)-amino]-ethoxy}-ethoxy)-ethoxy]-ethoxy}-propane-1-sulfonic acid). It will be referred to as "TP-CAE$_4$P—SO$_3$". Termonomer (b), which is 5, 5 bis-3,4 ethylenedioxythiophene, will be referred to as "bis-EDOT", and termonomer c), which is hydroxymethyl-3,4 ethylenedioxythiophene, will be referred to as "HM-EDOT".

Poly(TP-CAE$_4$P—SO$_3$-co-bis-EDOT-co-HM-EDOT) was synthesized by dissolving 700 mg of TP-CAE$_5$-SO$_3$ in 12.5 mL deionized water while heating to 75° C. in an oven for 15 minutes. Next, 325 mg of bis-EDOT and 75 mg of HM-EDOT were dissolved in 12.5 ml of N-methyl pyrrolidone while heating to 75° C. in an oven for 15 minutes. The two mixtures were then mixed, while vigorous blending took place for 2 minutes at 87° C., with the assistance of a magnetic stir bar/stir plate. Finally, 3.5 grams of ammonium cerium nitrate (98.5% purity) was added to the mixture, which was allowed to continue to stir, and the reaction was allowed to proceed for 2 hours at 87° C. (FIG. 3). The reaction was then stopped, and allowed to cool to room temperature. The polymer product was precipitated from the solution by adding 50 mL of deionized water. After precipitation, the supernatant was decanted and the polymer was dried overnight under nitrogen at 87° C. to remove residual solvent.

Figure 4:
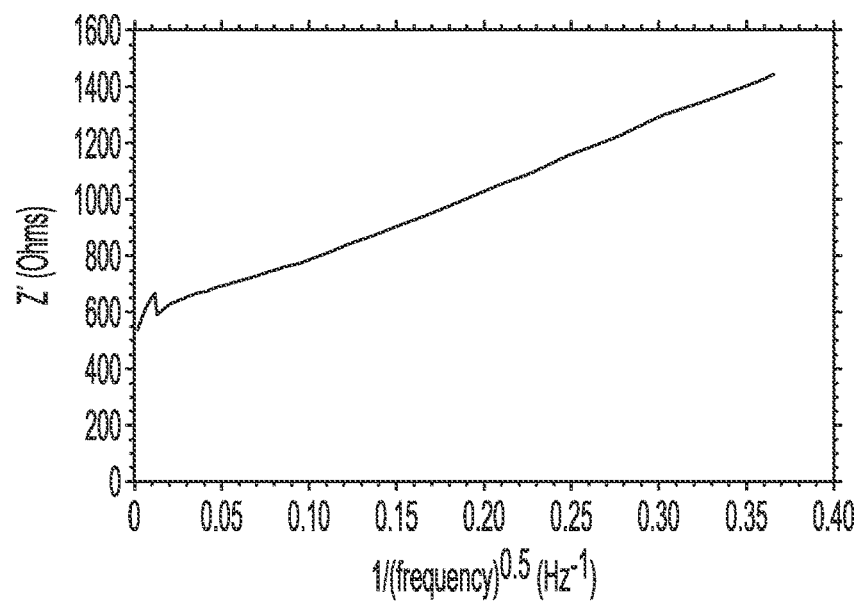
FIG. 4 depicts resistance of the conducting polymer as a function of the inverse of the perturbation frequency.

FIG. 4 shows the resistance of the conducting polymer as a function of the inverse of the perturbation frequency, as measured by electrochemical impedance spectroscopy. The slope of the plot is inversely related to the value of the ion diffusion coefficient in the material—the shallower the slope, the faster the ions move, and the more they contribute to the bulk conductivity of the material. From FIG. 4 it is seen that the average resistance of the polymer, coated as a thin film on a platinum electrode, is roughly 1000 Ohms.

The IPN was synthesized by blending the conducting polymer with the polyurethane support polymer, and adding a long-chain flexible diisocyanate to crosslink the conducting polymer chains through the hydroxyl group present in the HM-EDOT. For this purpose, the polar solvent N-methyl pyrrolidone was used. A third component, conducting carbon fibers (~50 microns in length) was added into the blend to act as an electron donor in the final IPN material. The blend was then cast into a support fabric such as cotton/nylon, wool, or carbon cloth that is electrically conducting. Typically, the casting was done to result in an IPN-fabric composite material having a weight ratio between 1 to 1 and 2 to 1. After the casting solvent dried, the formed IPN was found to be very adherent to the fabric and exhibited a high conductivity. The final component of the IPN, an ionic liquid, was then added in a relatively small amount (5 to 10 wt %). Its purpose was to assist in charge balance during the electroactive process that occurs in the polymer as it is switched into its closed state.

Figure 5:
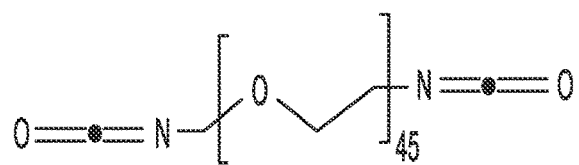
FIG. 5 provides the structure of the poly(propylene glycol-tolylene 2,4 diisocyanate) crosslinker.

For preparation of a typical IPN formation, 100 mg poly(TP-CAE$_4$P—SO$_3$-co-bis-EDOT-co-HM-EDOT) was added to 1.0 mL N-methyl pyrrolidone containing 5 wt % dissolved polyurethane (50 mg, trade name MVT 75®, originally manufactured by BF Goodrich). Next, 20 mg chopped carbon (graphite) fibers (trade name Granoc®, manufactured by Nippon Graphite Fiber Corporation) were added. The mixture was then blended vigorously for 20 minutes using a magnetic stir bar/stir plate (stirring rate ~1000 rpm). Next, 10 mg of the long-chain crosslinker poly(propylene glycol-tolylene 2,4 diisocyanate) (FIG. 5) was added to the solution, followed by 1.0 mg of the catalyst iron(III) acetylacetonate. The mixture was immediately stirred for 1 minute using a magnetic stir bar/stir plate (stirring rate ~500 rpm). Finally, the mixture was cast onto conducting carbon fabric (Zorflex®, manufactured by Calgon, Inc.) having an area of 2 cm×2 cm, and a weight of ~80 mg. The fabric was pre-heated to 80° C. in an oven, and the curing process was allowed to proceed in the oven at 80° C. overnight under nitrogen flow. The resulting IPN-fabric composite was found to have a weight of 160 mg, and an IPN-fabric weight ratio of 2:1.

The synthesis was furthered by adding 8 microliters of the ionic liquid (IL) 1-butyl-3-methyl imidazolium tetrafluoroborate, blended into an ethanol carrier in an amount of 33 wt %. Specifically, 10 microliters of IL was added to 20 microliters ethanol, and mixed thoroughly. Next, 24 microliters of this solution was added dropwise to the IPN-fabric composite, with care being taken to ensure an even distribution across the fabric. The composite was then allowed to dry overnight before further characterization was undertaken.

Figure 6:
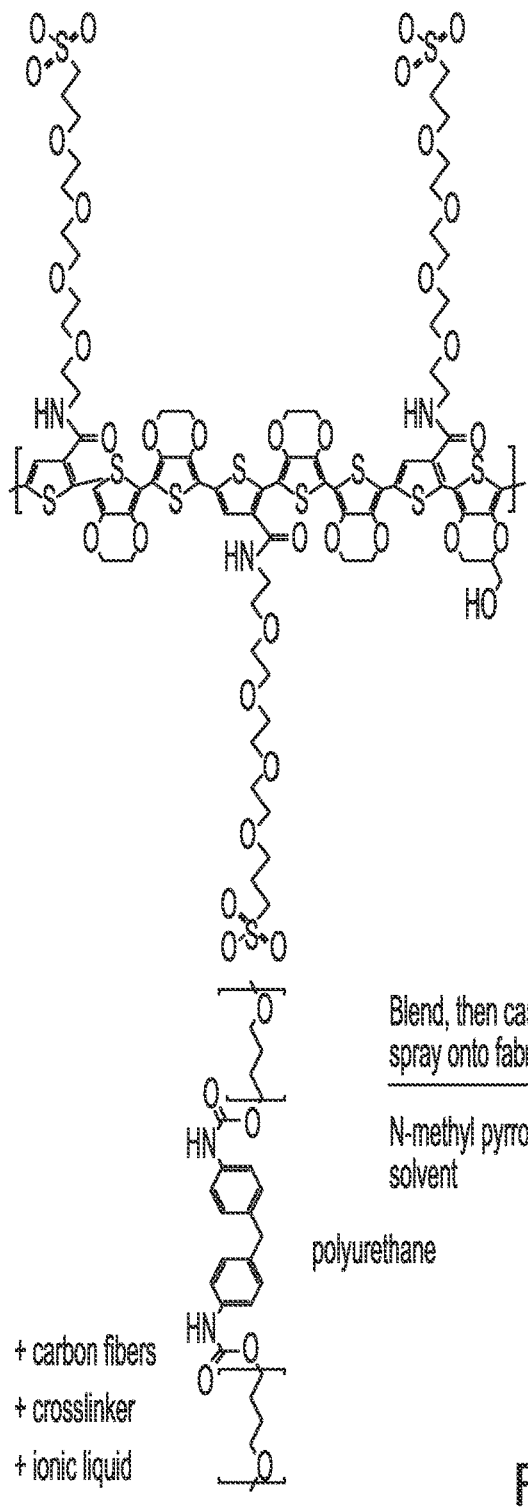
FIG. 6 shows IPN composition.
Figure 6:
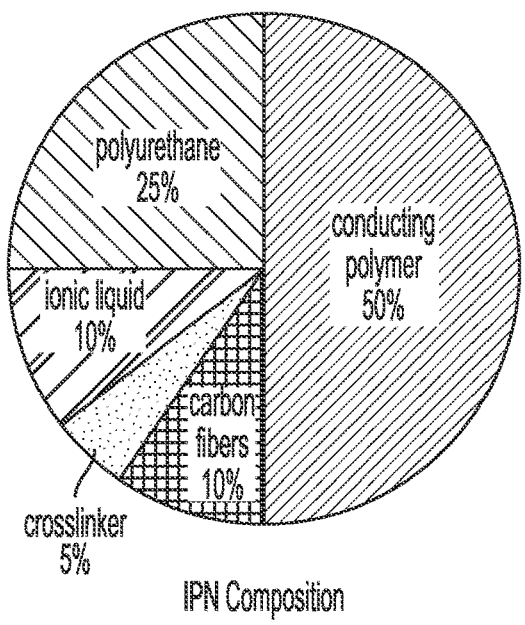
Figure 7:
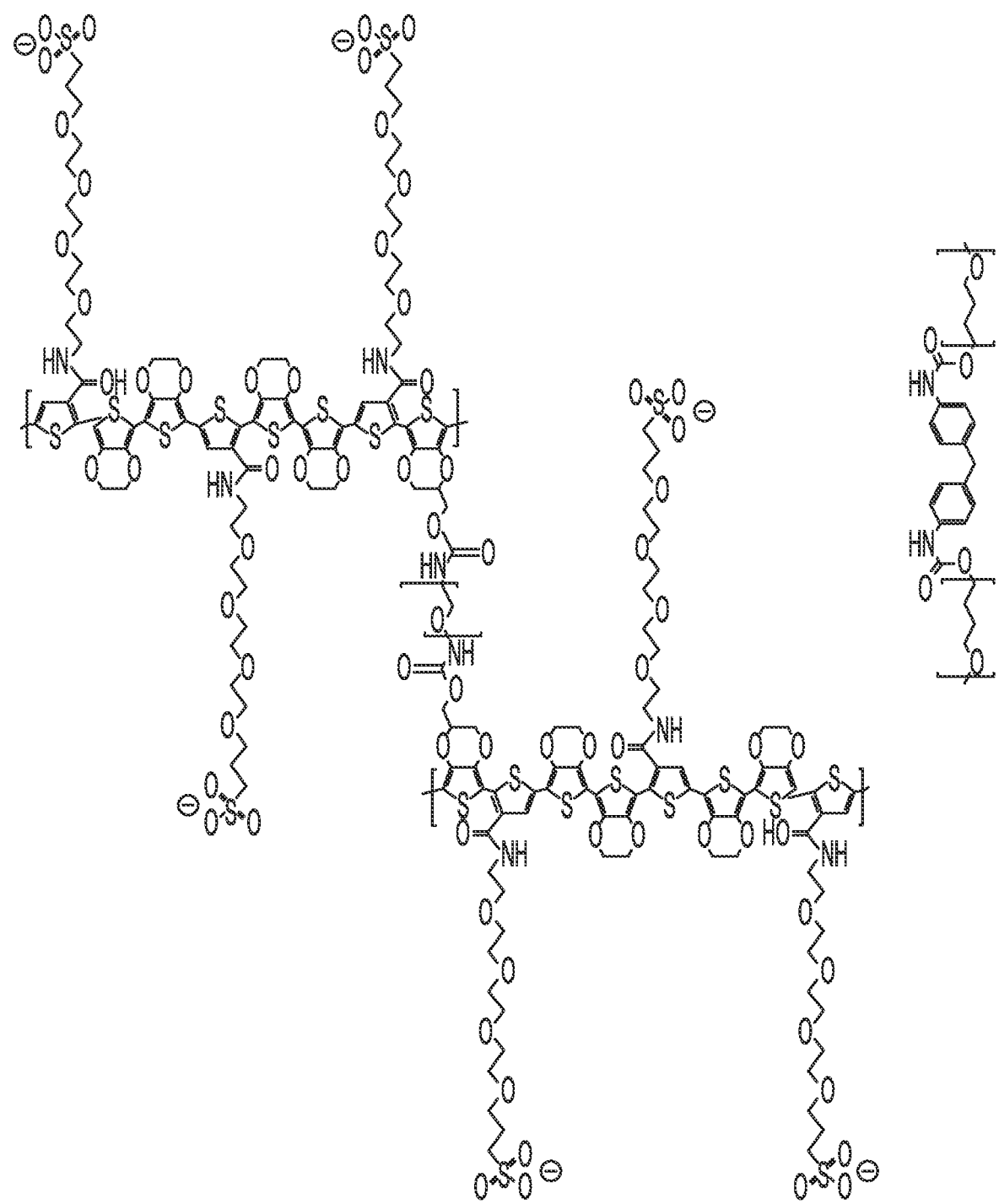
FIG. 7 displays the structure of IPN net-(poly(TP-CAE$_4$P—SO$_3$-co-bis-EDOT-co-HM-EDOT)-co-(poly(propylene glycol-tolylene 2,4 diisocyanate)))-ipn-(net-(polyurethane)), termed "IPN 1".

The composition of the IPN is depicted in FIG. 6. The IUPAC designation of its polymeric structure is net-(poly(TP-CAE$_4$P—SO$_3$-co-bis-EDOT-co-HM-EDOT)-co-(net-(poly(propylene glycol-tolylene 2,4 diisocyanate)))-ipn-(polyurethane). It will be referred to as "IPN 1". The polymer structure is shown in FIG. 7. The countercation for the tethered sulfonate is either sodium or ammonium ion.

Theory of IPN Electroactuation from Open to Closed State

In this model, the electroactive IPN is able to generate a closed, protective state via charge rearrangement that causes a change in the physical properties of the conducting polymer (CP) component. In its open, breathable state the CP is oxidized, polycationic and mechanically relatively rigid.

The negatively-charged tethers attached to the CP main chain form ion pairs either with the cationic centers in the main chain, or with cationic centers on neighboring CP chains. Either configuration contributes to a mechanically rigid structure with an open nanoporosity that is conducive to high moisture vapor transport (MVT) rates. When electrons are added into the IPN—when it is reduced—the cationic centers in the CP main chain are neutralized, and the negatively-charged tethers are released. The neutralized CP main chains experience attractive forces due to pi-pi interactions between the now-aromatic repeat units and aggregate. This increases the density of the IPN, and results in the protective closed state.

The source of the reducing electrons, which are carbon fibers in another region of the IPN, now contain cationic centers themselves. These are neutralized by the ionic liquid anions. Simultaneously, ionic liquid cations pair with the freed negatively-charged tethers to maintain charge balance.

This process is driven by a voltage bias that is applied between a working and counter electrode. The electrodes may be placed in a sandwich configuration in which the IPN-fabric composite is placed in the center, or in a parallel configuration in which both electrodes are placed on top of the IPN fabric composite. The voltage bias ranges between −1 and 4 volts and results in reduction at the working electrode with oxidation at the counterelectrode. A DC power supply is used to generate the bias.

Figure 8:
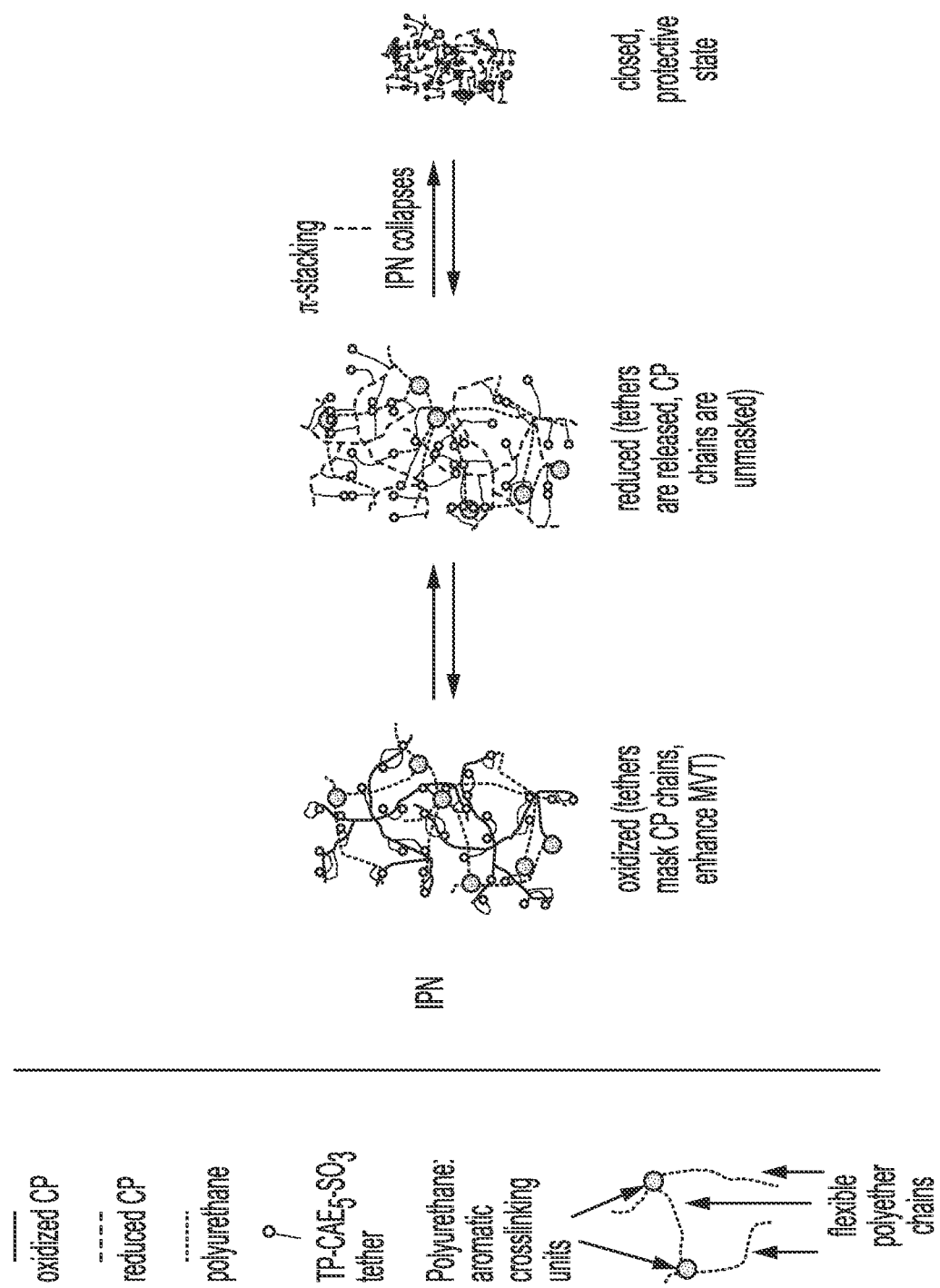
FIG. 8 illustrates the role of tether in the formation of the IPN closed protective state.

FIG. 8, a detailed version of FIG. 1, depicts the IPN with its CP and polyurethane components. The oxidized state of the CP, which yields the open state of the IPN, is shown in blue. The negatively charged tethers are shown in an intramolecular ion-pairing configuration. When the CP is reduced (now shown in red), the tethers are released, exposing the CP main chains to one another, and allowing them to aggregate via pi-pi interactions. This causes a localized increase in IPN density which results in the protective closed state.

Figure 9:
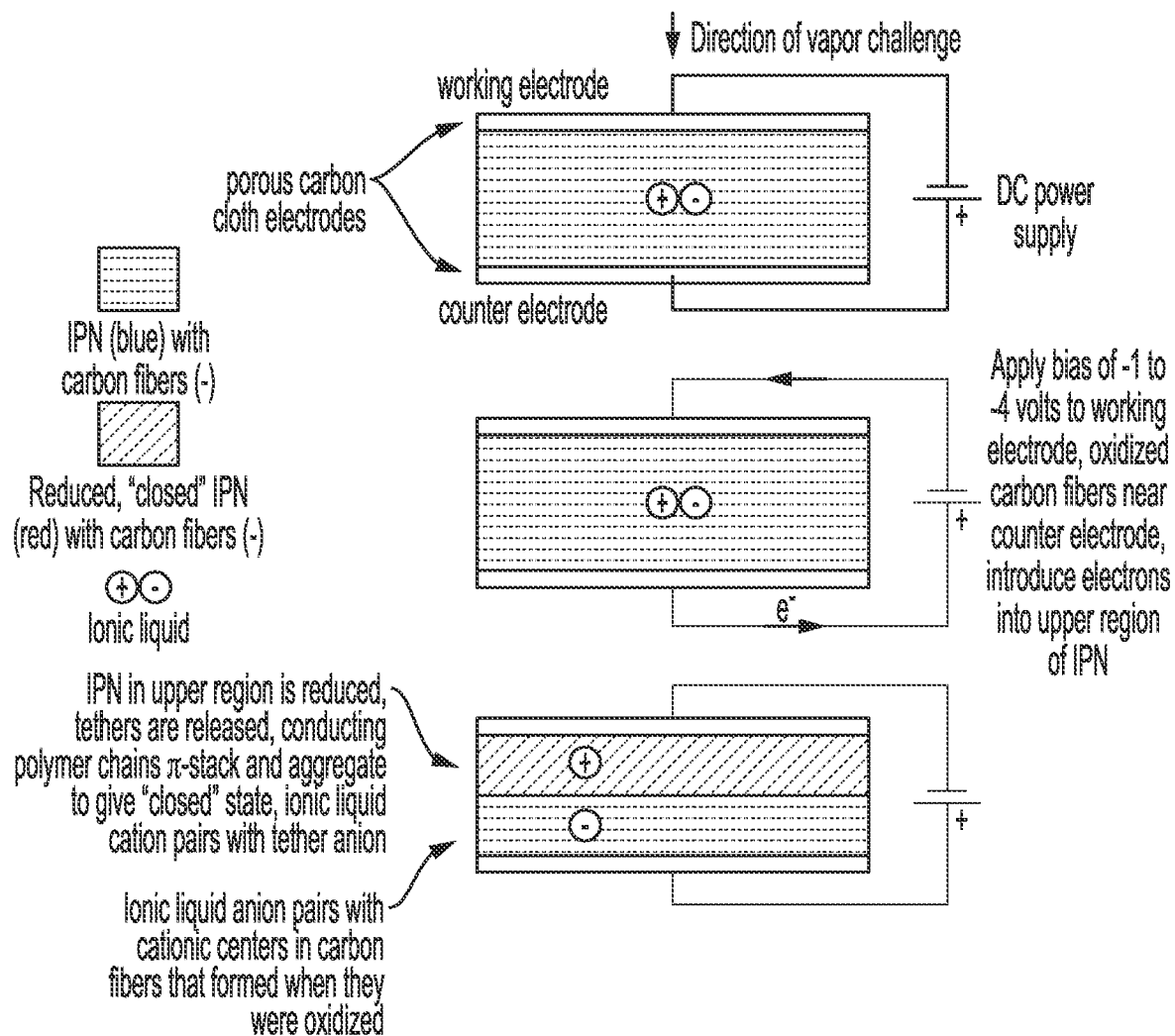
FIG. 9 is a schematic showing the electroactuation of IPN and formation of closed state, with the fabric IPN support not shown.

FIG. 9 shows the IPN-fabric in a sandwich configuration between a working and counter electrode. Both electrodes are constructed from porous conducting carbon cloth (such as Zorflex®), which is readily commercially available. The porosity allows the cloth to have a high MVT. This Figure depicts the switching of the IPN into its closed state, in the top region of the IPN-fabric, and the resulting charge balancing that is undertaken by the ionic liquid component.

Results from IPN Electroactuation

Figure 10:
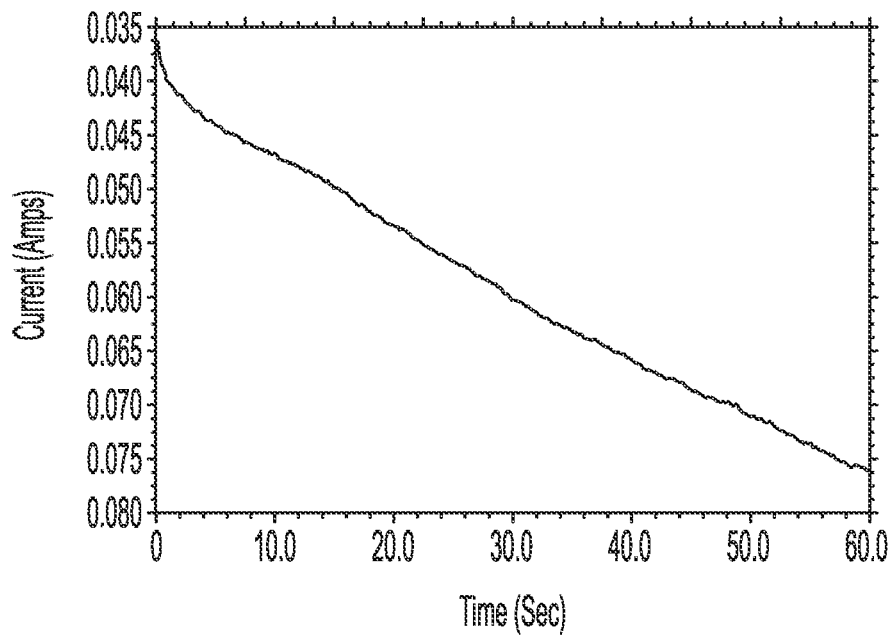
FIG. 10 shows an example of the current flow between the top and bottom electrodes as a reducing voltage bias of −2.0 V is applied to transform the composite into its closed protective state.
Figure 11:
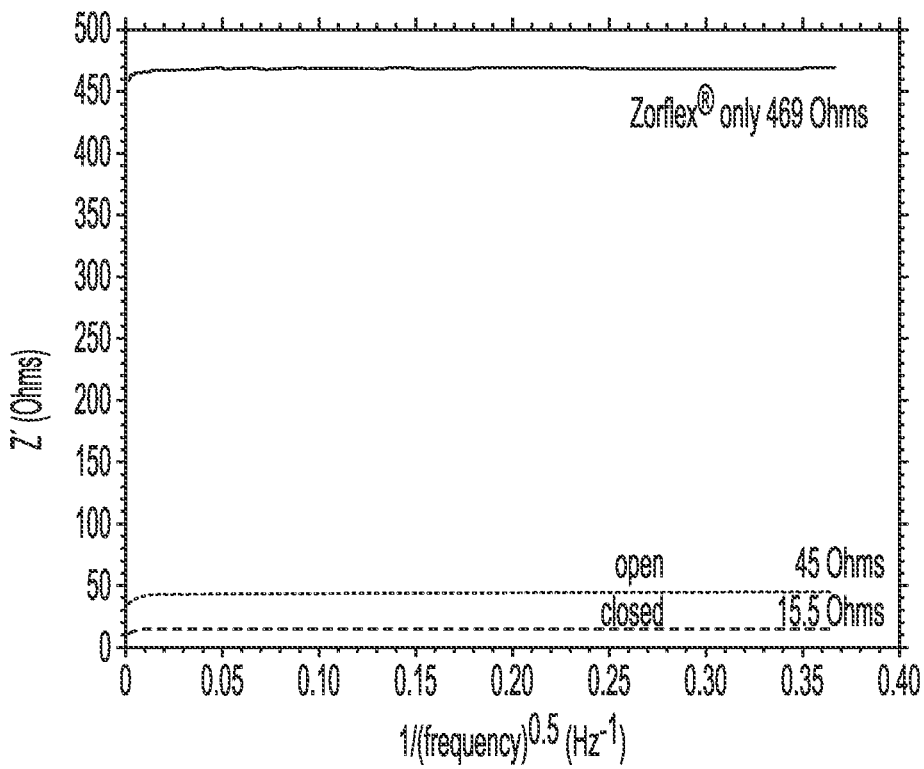
FIG. 11 is a plot of resistance vs. the inverse of the perturbation frequencies used in the impedance spectroscopy, which depicts the decreases in composite resistance as the IPN is switched from its open state (45 Ohms) to the closed state (15.5 Ohms).

FIG. 10 shows an example of the current flow between the top and bottom electrodes as a reducing voltage bias of −2.0 V is applied to transform the composite into its closed or protective state. In this case, 3.50 Coulombs of charge passes during the time duration of the voltage application. The steady increase of the current level indicates that the conductivity of the composite increases as the IPN is reduced. FIG. 11, a plot of resistance vs. the inverse of the perturbation frequencies used in the impedance spectroscopy, depicts the decreases in composite resistance as the IPN is switched from its open state (45 Ohms) to the closed state (15.5 Ohms). The conductivity increase may arise from pi-stacking of the CP chains. The resistance of the uncoated Zorflex® (469 Ohms) is shown also. As discussed below, the horizontal nature of the plots indicate that ion diffusion processes in the composite are relatively very fast.

In terms of general parameters, to transform the material into its closed state, the voltage bias used ranged from −1 to −5 volts, the current ranged from 0.005 to 0.24 amps, the charge passage ranged from 0.20 to 14 Coulombs, and the time of voltage application ranged from 10 to 180 seconds.

Synthesis of Comparative Conducting Polymers and IPNs

Figure 12:
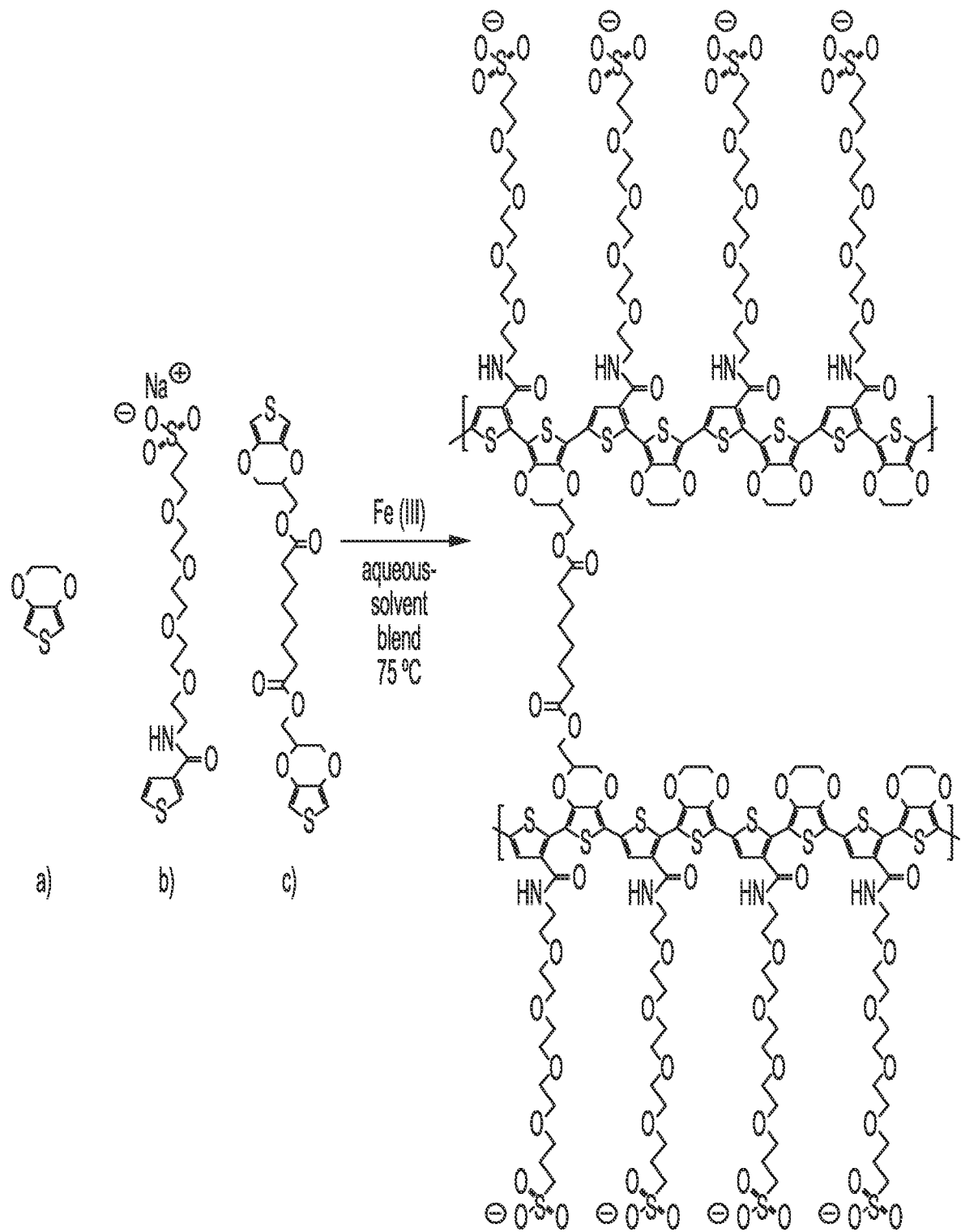
FIGS. 12 and 13 show the syntheses of conducting polymers A and B, respectively.

In a typical synthesis of conducting polymer A (depicted in FIG. 12), 1.6 mL anisole containing 60 mg EDOT-ODA-EDOT and 404 EDOT was added to 1.4 mL ethanol containing 240 mg TP-CAE$_4$P—SO$_3$. This mixture was then added to 2.0 mL ethanol containing 1.2 g iron (III) tosylate hexahydrate oxidant, and the blend was mixed vigorously for 5 minutes at room temperature. The solution was then cast into 8 cm$^2$ of wool fabric, which was then heated at 75° C. overnight in an oven. The resulting conducting polymer-fabric composite had a polymer-fabric weight ratio of 2 to 1. The residual iron (II) salts were removed by immersion of the composite in hot water (80° C.) and agitation for one minute. The composite was permitted to dry for 4 hours at 75° C., and its electrical resistance was then characterized using electrical impedance spectroscopy.

Figure 13:
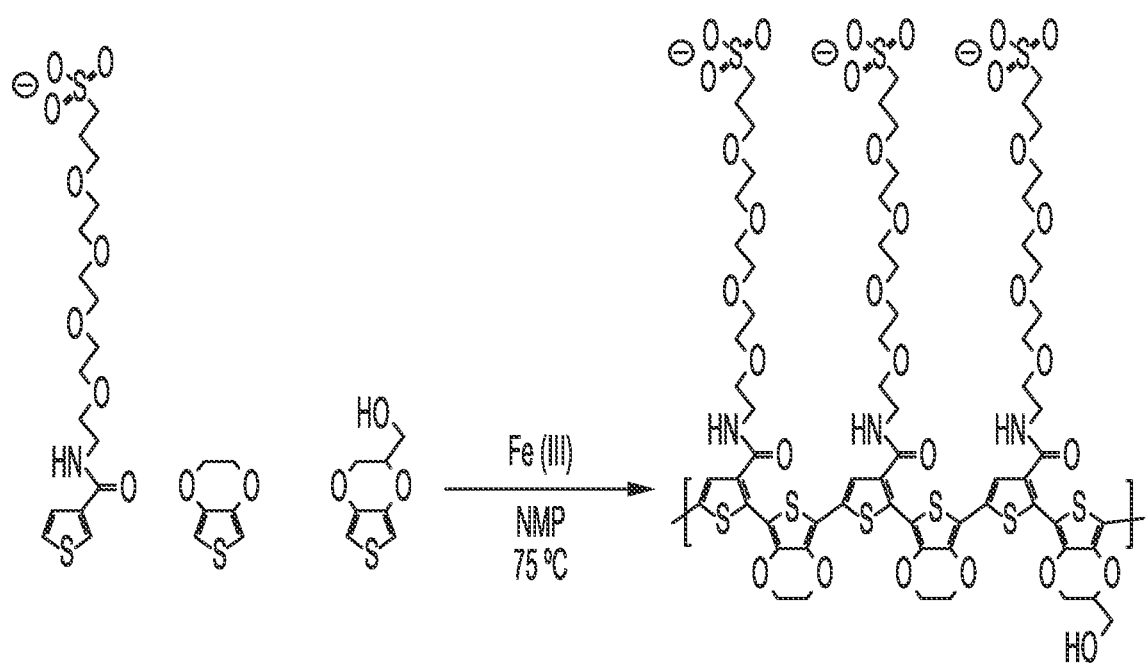

In a typical synthesis of conducting polymer B (depicted in FIG. 13), 3.0 mL N-methyl pyrrolidone (NMP) containing 150 mg TP-CAE$_4$P—SO$_3$, 15 µL 3,4 ethylenedioxythiophene (EDOT), and 36 mg HM-EDOT was added to 3.0 mL N-methyl pyrrolidone. Next, 240 mg iron (III) chloride was added and the reaction was performed at 60 C for 1 hour. The NMP solvent was removed at 60° C. overnight under vacuum provided by a vacuum pump. The dry product was then washed with methanol three times to remove the iron (II) byproduct. The final product poly(TP-CAE$_4$P—SO$_3$-co- EDOT-co-HM-EDOT) could be re-dissolved in NMP for characterization using electrical impedance spectroscopy.

Synthesis of polymer C of the present invention, namely poly(TP-CAE$_4$P—SO$_3$-co-bis-EDOT-co-HM-EDOT), was described at above.

Figure 14A:
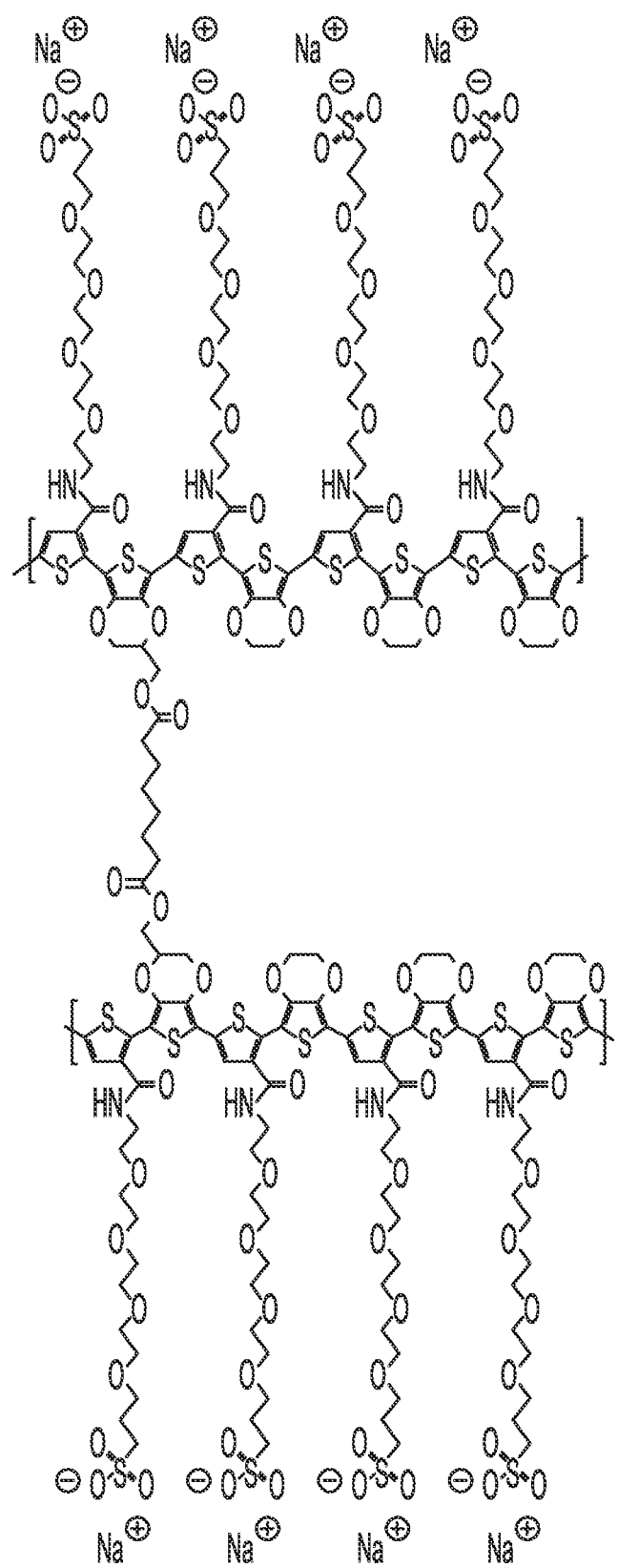
FIGS. 14A-14C illustrate the structures of conducting polymers A, B, and C.
Figure 14C:
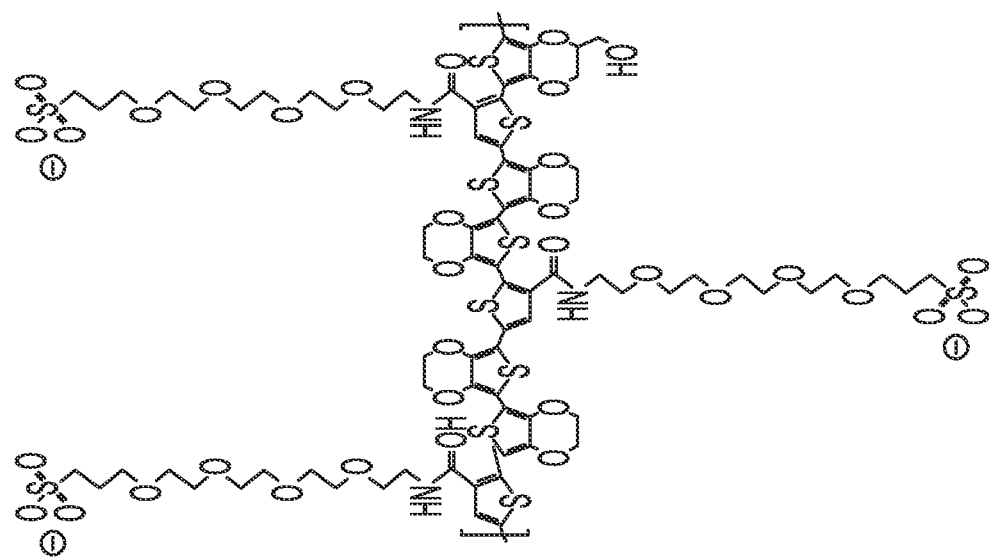
Figure 14B:
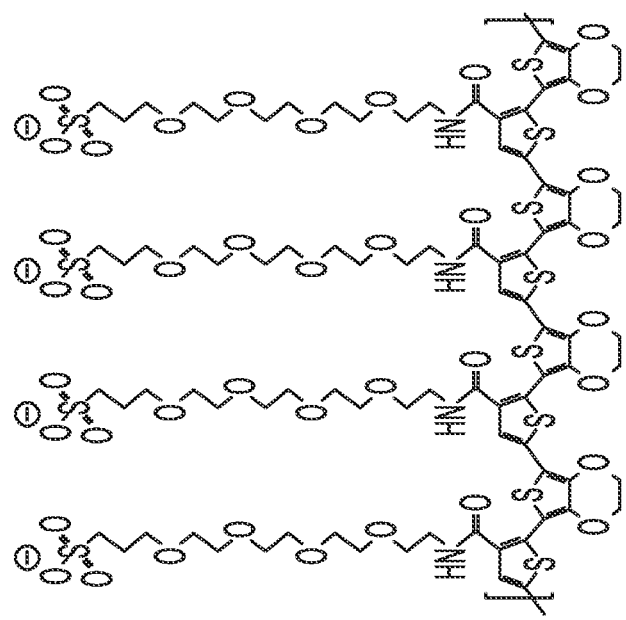
Figure 15:
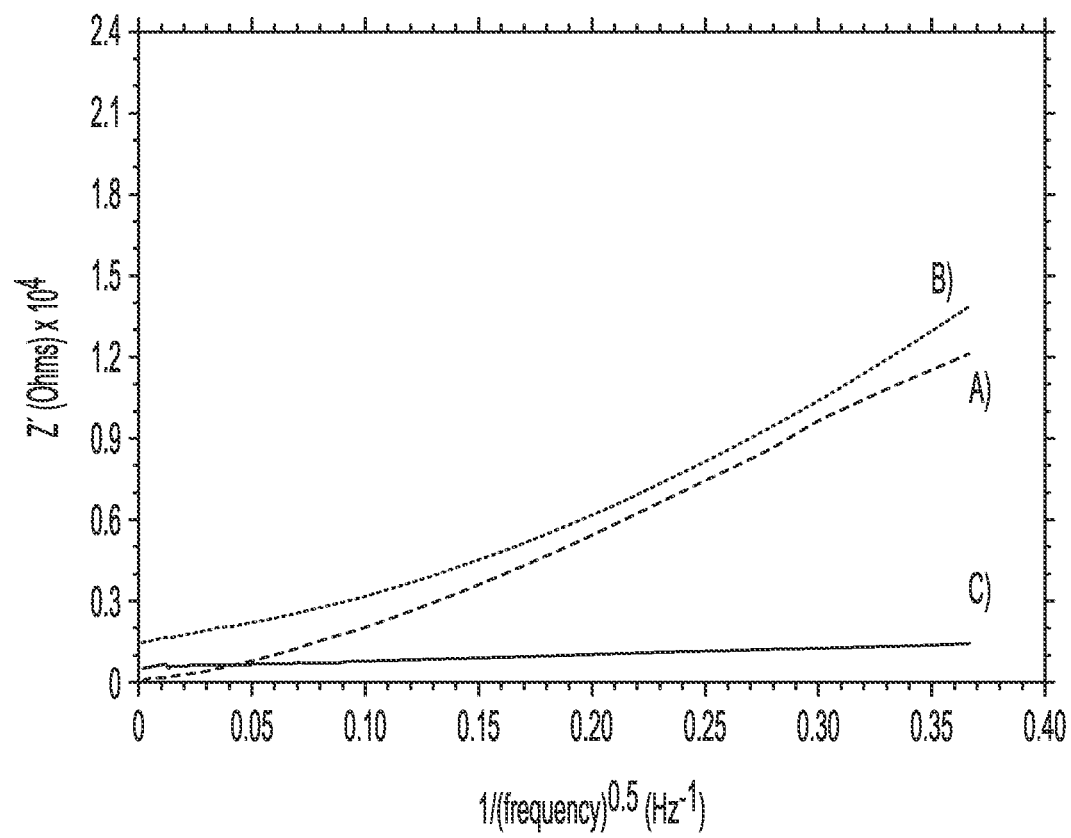
FIG. 15 shows the resistances of conducting polymers A, B, and C.

The structures of conducting polymers A, B, and C are provided in FIG. 14. It can be seen that a primary difference among them that the bis-EDOT moiety is present in the polymer C but the other two contain only singular EDOT units. This contributes to a regioregularity in the latter that likely contributes to a higher conductivity as is seen in FIG. 15, which shows that polymer A has an average resistance of 4500 Ohms, polymer B has a resistance of 6300 Ohms, and polymer C having the lowest, ~1000 Ohms. It was anticipated that lower polymer resistance will contribute to greater IPN electroactivity and the creation of the most effective IPN closed protective states.

To form IPN 2, 10 mg of conducting polymer B was blended into 0.1 mL of a 5 wt % polyurethane—NMP solution, followed by blending addition of 2 mg carbon fibers, 1.5 mg poly(isocyanate) manufactured by Bayer Ltd. (Bayhydur®), and 0.5 mg iron (III) acetylacetonate.

Figure 16A:
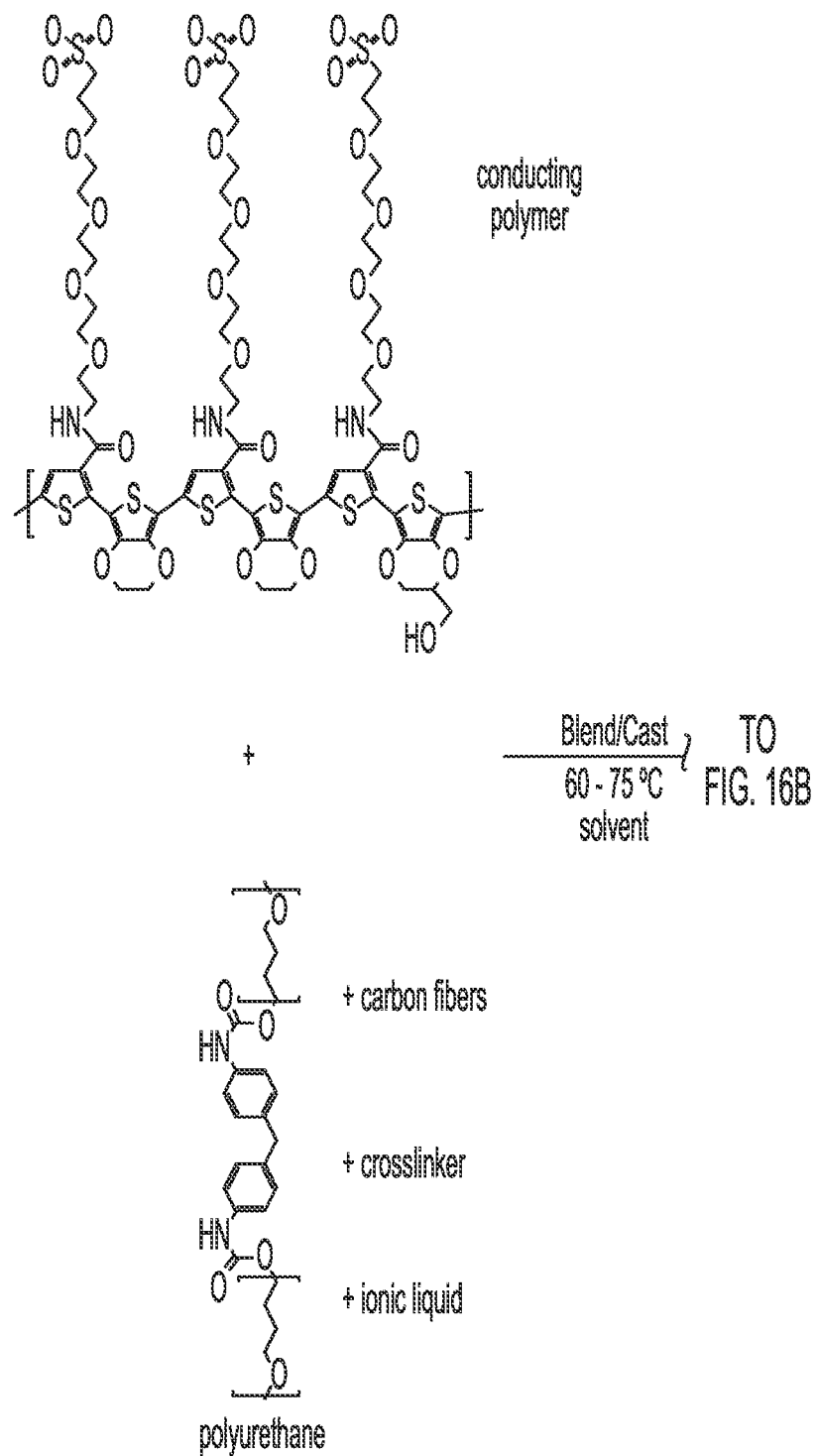
FIGS. 16A and 16B illustrate the synthesis of IPN 2.
Figure 16B:
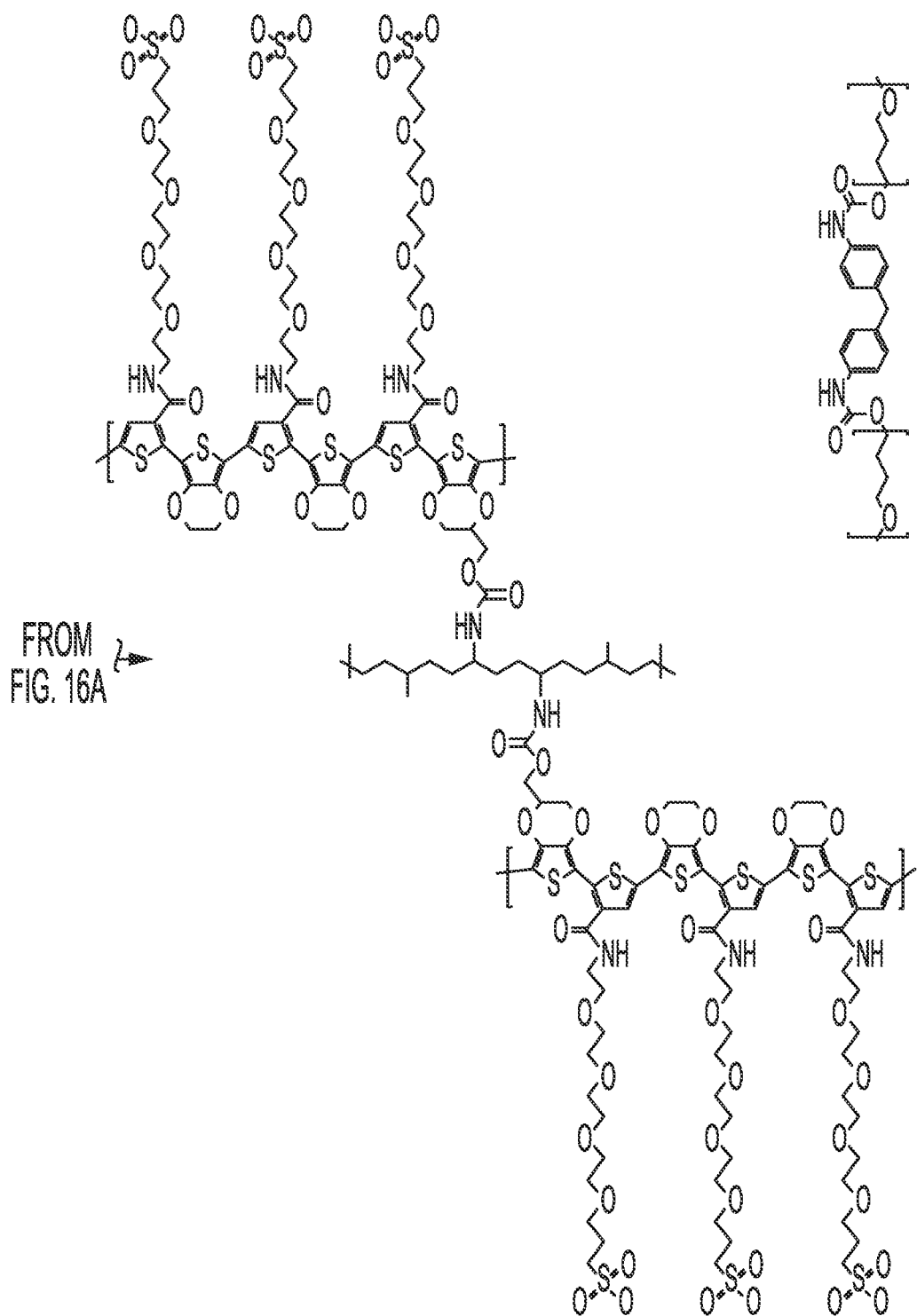

The solution was then divided into two parts of equal volume, and cast into two samples of polyester fabric of dimensions 1.25 cm×1.75 cm each (FIG. 16). Each polyester sample weighed 20 mg before the casting. Each IPN-fabric sample was allowed to cure overnight at 78° C. The next day, the samples were subjected to an identical casting, except that an additional 0.05 mL NMP was added to the 0.1 mL NMP-polyurethane solution, and then the other components were added. This dilution resulted in an improved dispersion and solvation of the components. The second casting resulted in IPN-fabric composites having the following weight percentage of each component—52 wt % fabric support, and 48 wt % crosslinked IPN. The IPN consisted of 54 wt % conducting polymer, 27 wt % polyurethane, 11 wt % carbon fibers, and 8 wt % polyisocyanate. The samples were then briefly washed with DI water to remove iron salts originating from the iron (III) acetylacetonate catalyst. The ionic liquid 1-ethyl-3-methyl imidazolium-bis-(perfluoroethylsulfonyl) imide was then added into the IPN (via 30% solution in ethanol), to give a final concentration of 9 wt % (ethanol fraction assumed evaporated). At this point the composition of the IPN was 49 wt % conducting polymer, 25 wt % polyurethane, 10 wt % carbon fibers, 9 wt % ionic liquid and 7 wt % polyisocyanate.

Figure 17A:
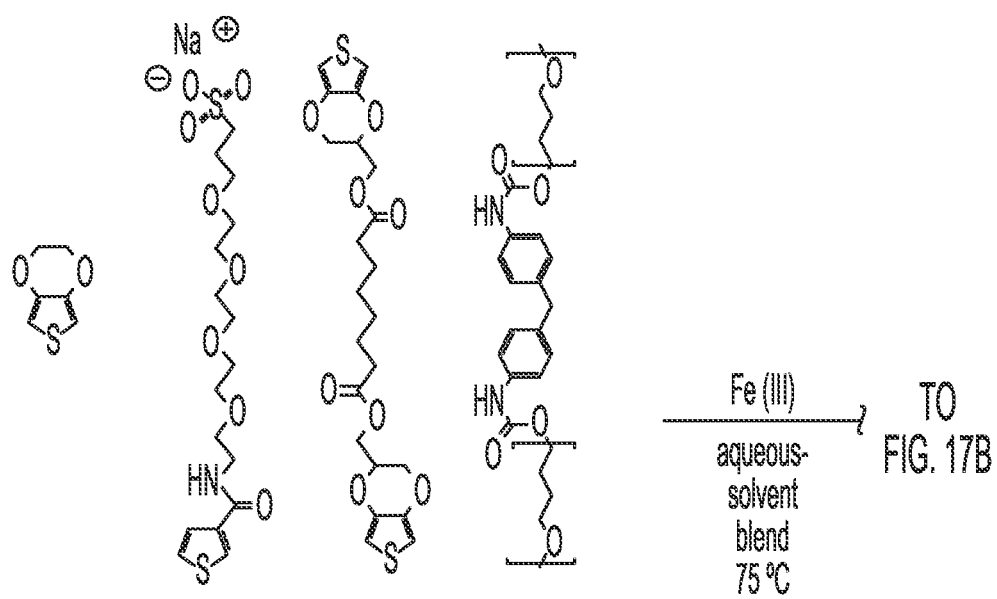
FIGS. 17A and 17B illustrate the synthesis of IPN 3.
Figure 17B:
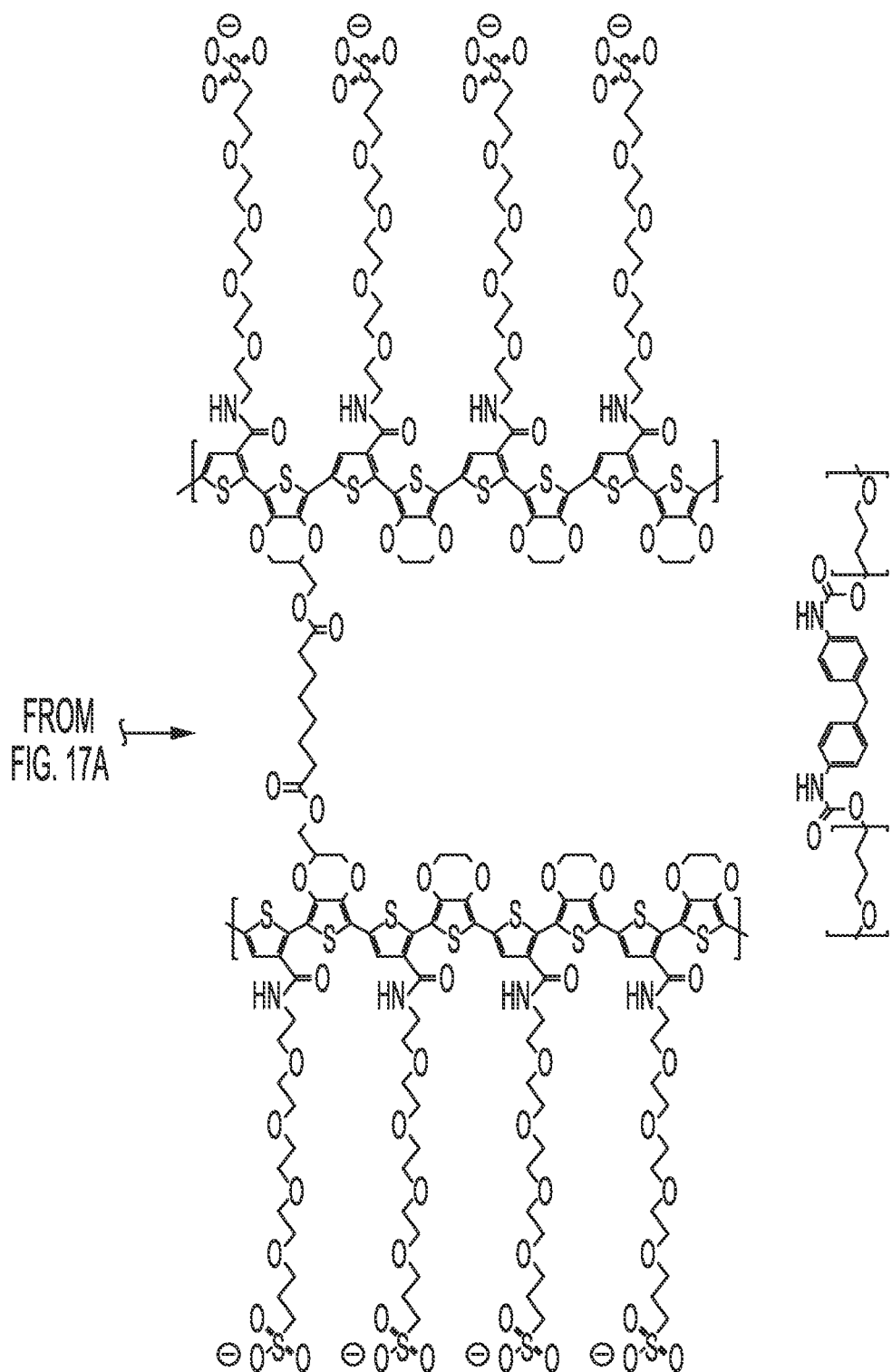
Figure 18A:
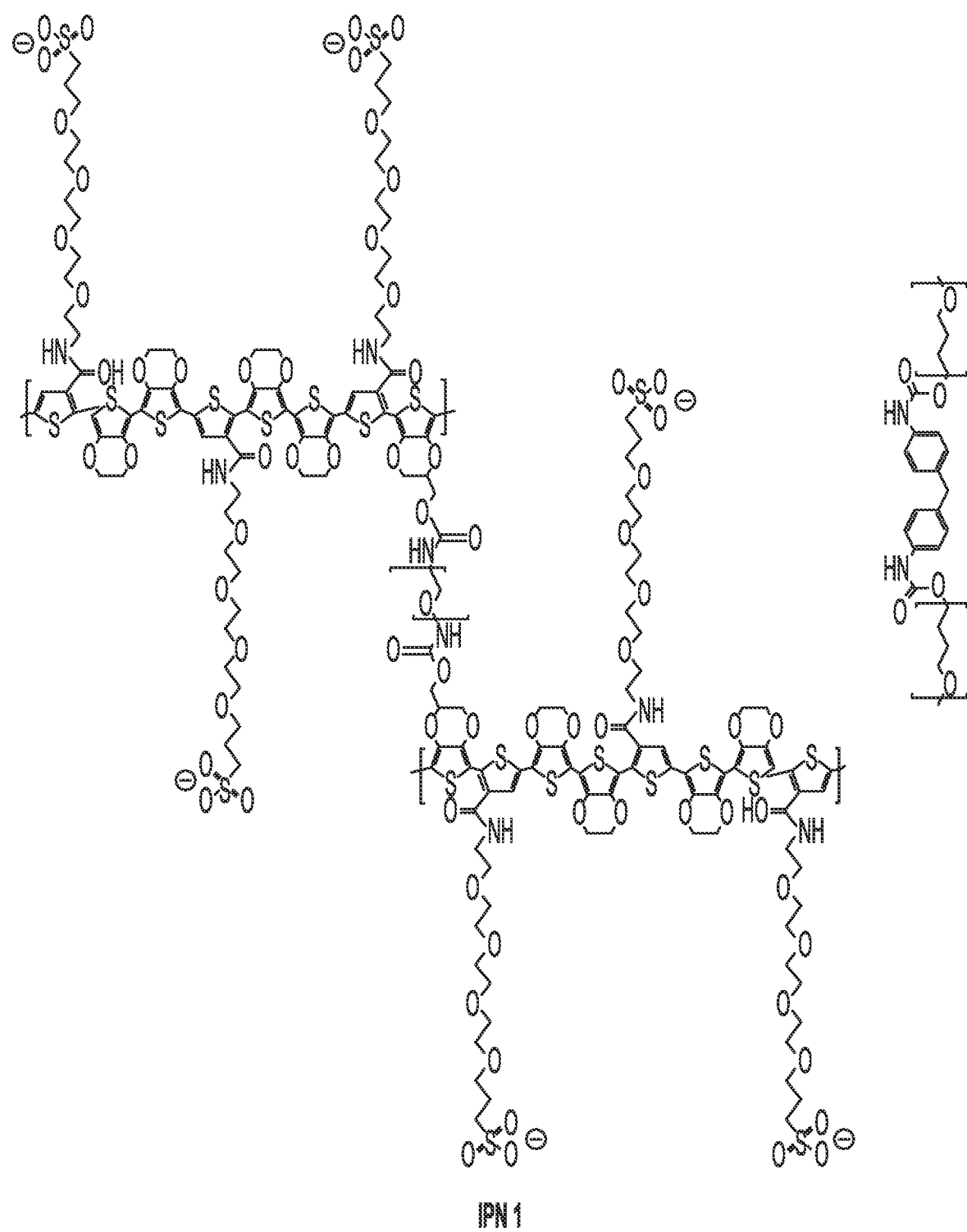
FIGS. 18A-18C show the structure of IPNs 1 through 3.
Figure 18B:
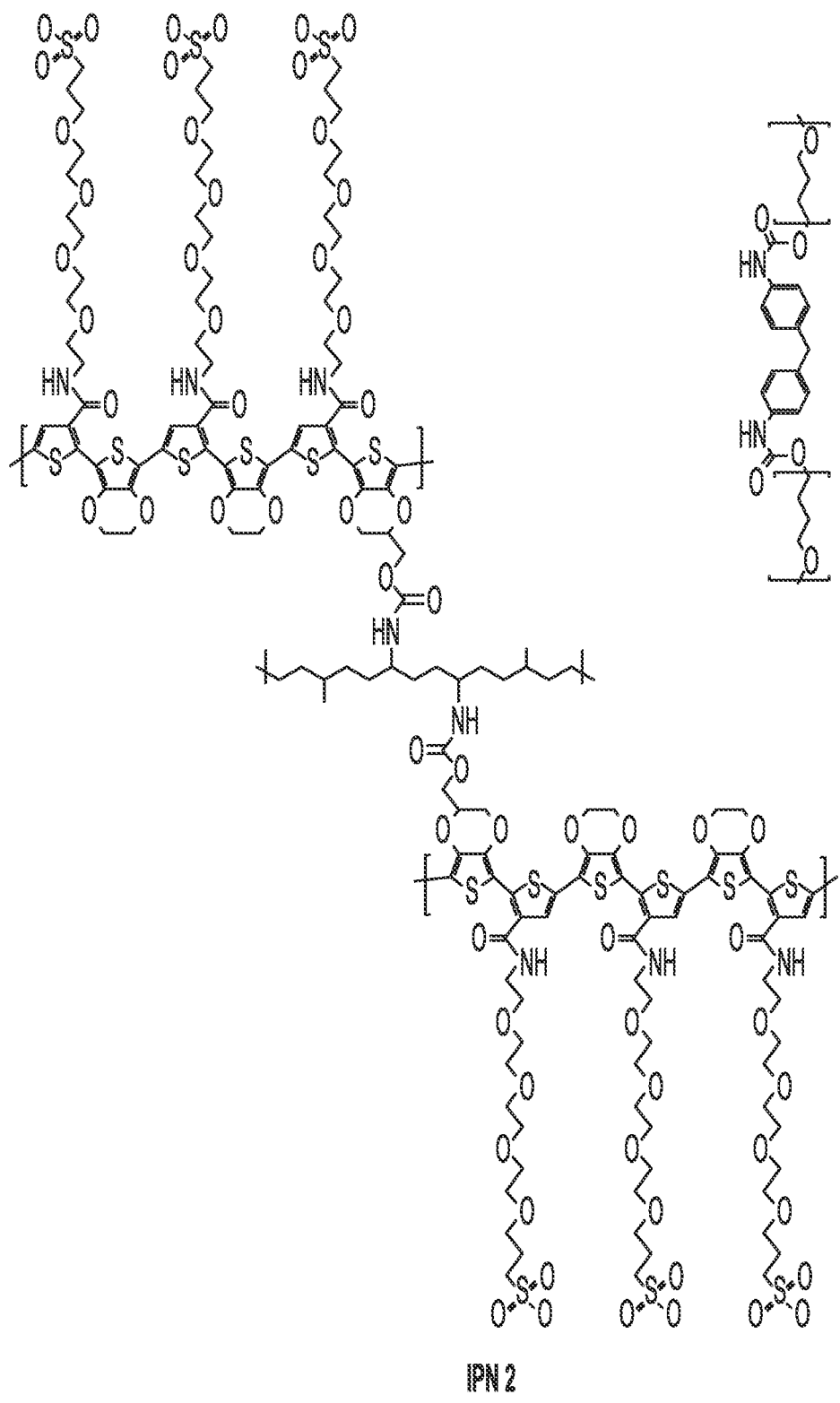
Figure 18C:
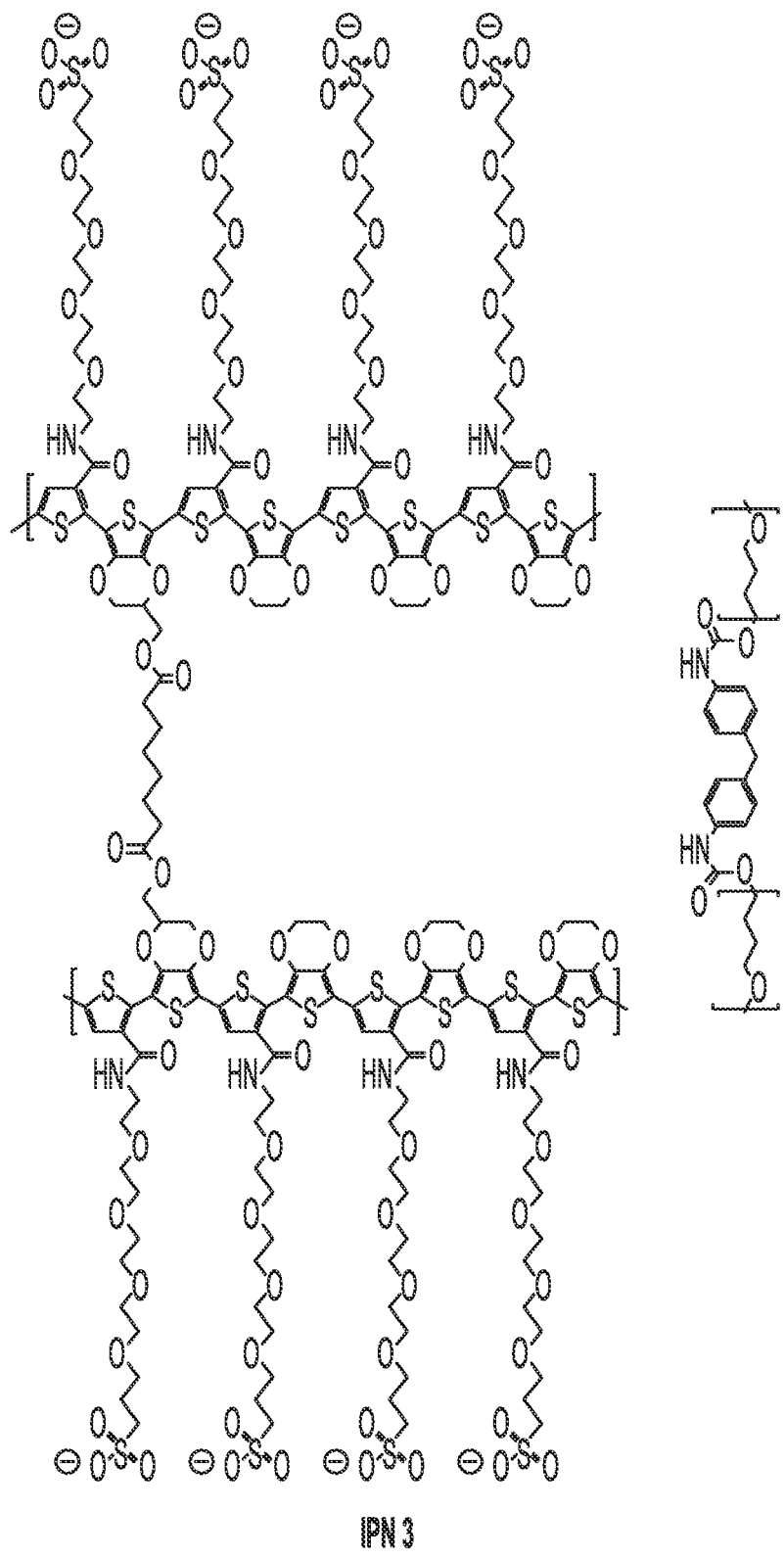

In a typical synthesis of IPN 3, 1.7 mL of THF containing 10 wt % polyurethane was and 50 mg chopped carbon fibers was added to 1.6 mL anisole containing 60 mg EDOT-ODA-EDOT. Next, 404 EDOT was added to 1.4 mL ethanol containing 240 mg TP-CAE$_4$P—SO$_3$. This mixture was then added to 2.0 mL ethanol containing 1.2 g iron (III) tosylate hexahydrate oxidant, and the blend was mixed vigorously for 20 minutes at room temperature. The solution was then cast into 14 cm2 of wool fabric, which was then heated at 75 C overnight in an oven (FIG. 17). The resulting IPN-fabric composite had an IPN-fabric weight ratio of 2 to 1. The residual iron (II) salts were removed by immersion of the composite in hot water (80° C.) and agitation for one minute. The composite was permitted to dry for 4 hours at 75° C., and its electrical resistance was then characterized using electrical impedance spectroscopy. The structures of IPNs I through III are given in FIG. 18.

Electroactuation of Comparative IPNs

Figure 19:
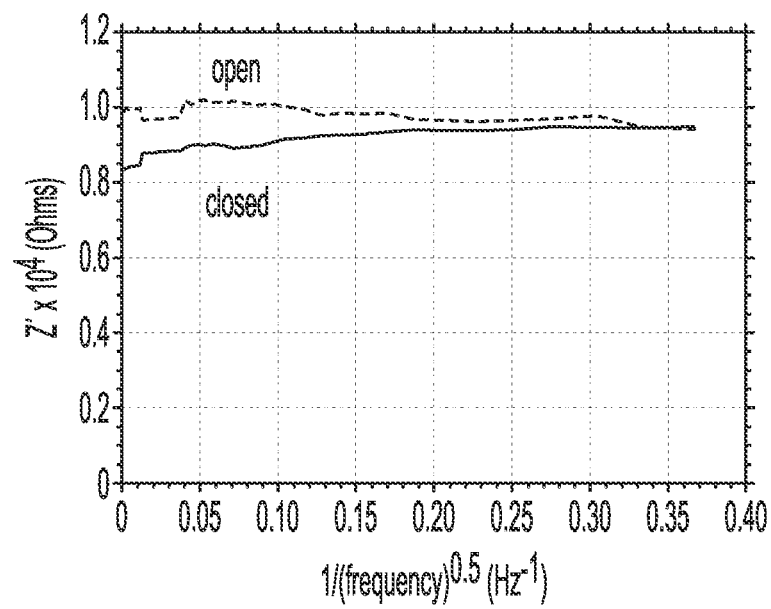
FIGS. 19 and 20 indicate resistances of the open and closed states of IPN 2-fabric composite and IPN 3-fabric composite, respectively.
Figure 20:
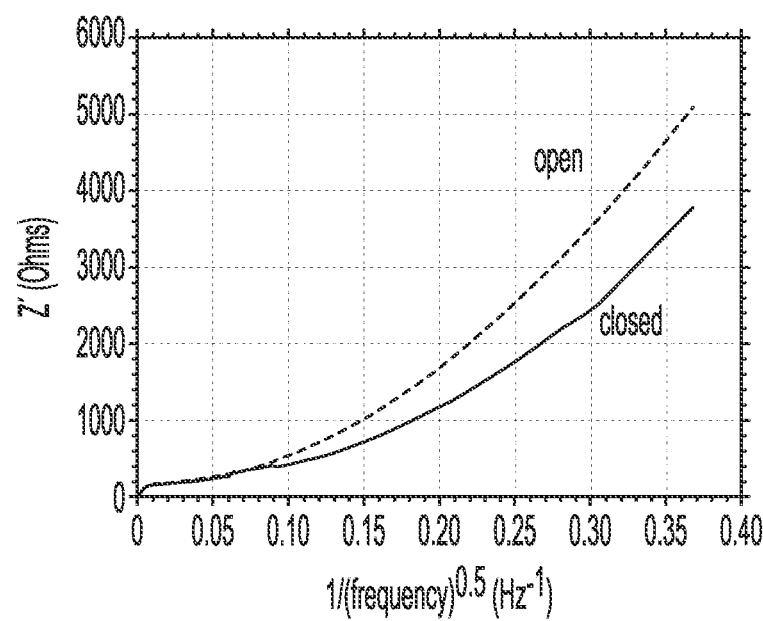

The IPNs 2 and 3 were switched into their closed, protective state by application of a small negative voltage bias, usually between 1 and 2.5 volts (see Theory of IPN Electroactuation from Open to Closed State, above) for time periods normally ranging from 30 to 180 seconds. Since the actuation causes a chemical change and rearrangement of the polymer chains, the conductivity of the composites changes, increasing as the material is transformed into its closed state. The resistance of the materials in their open and closed states is depicted in FIGS. 19-20.

Characterization of Comparative IPNs

Figure 21:
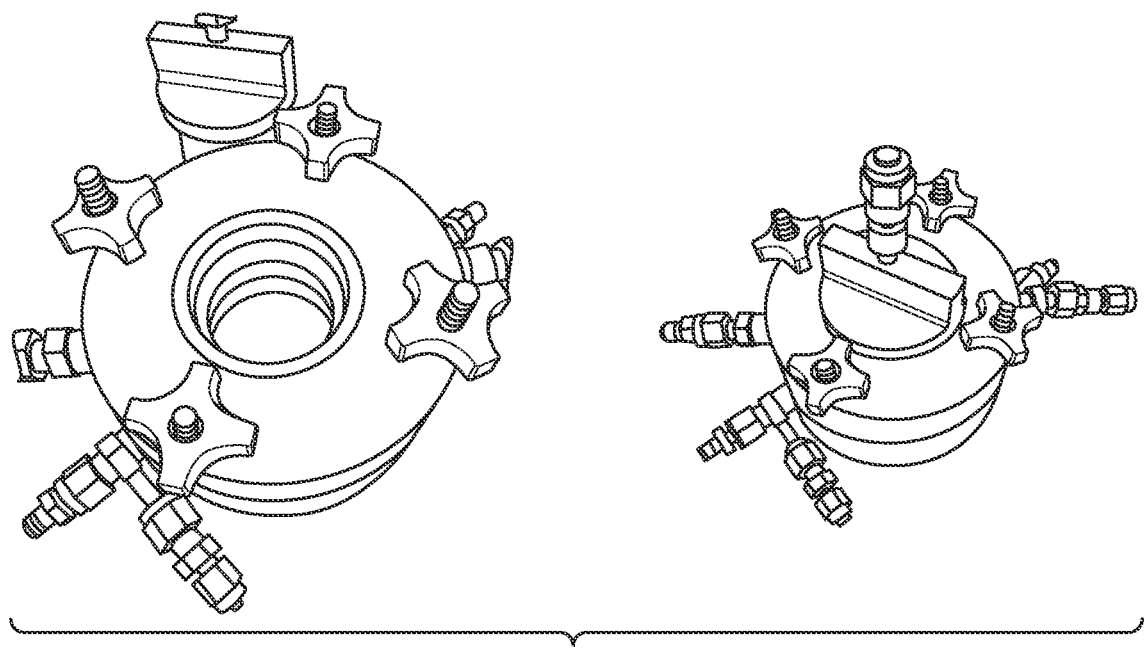
FIG. 21 shows the standard testing cell for measurement of vapor permeation rates through solid samples.
Figure 22:
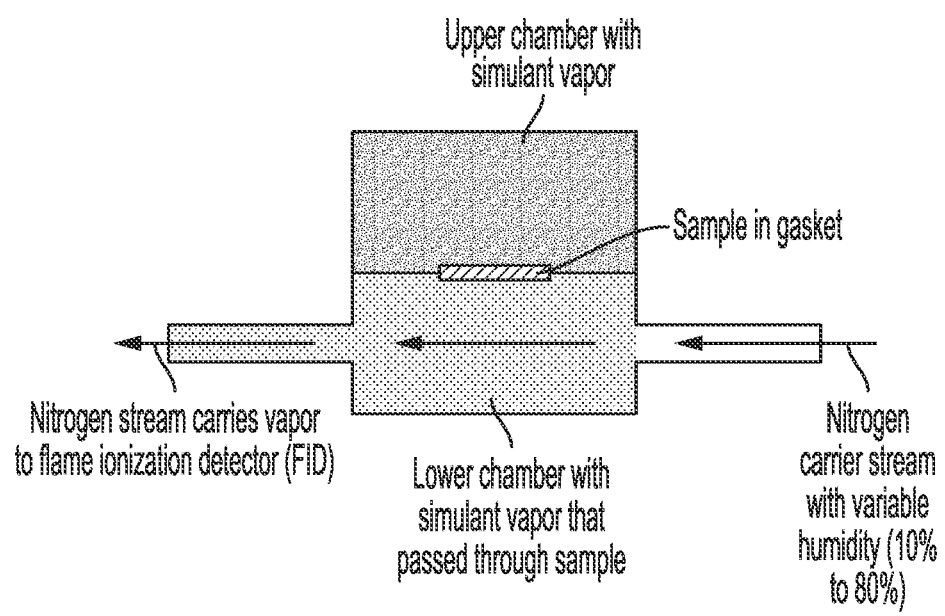
FIG. 22 is a schematic of a testing cell showing the nitrogen carrier stream.
Figure 23:
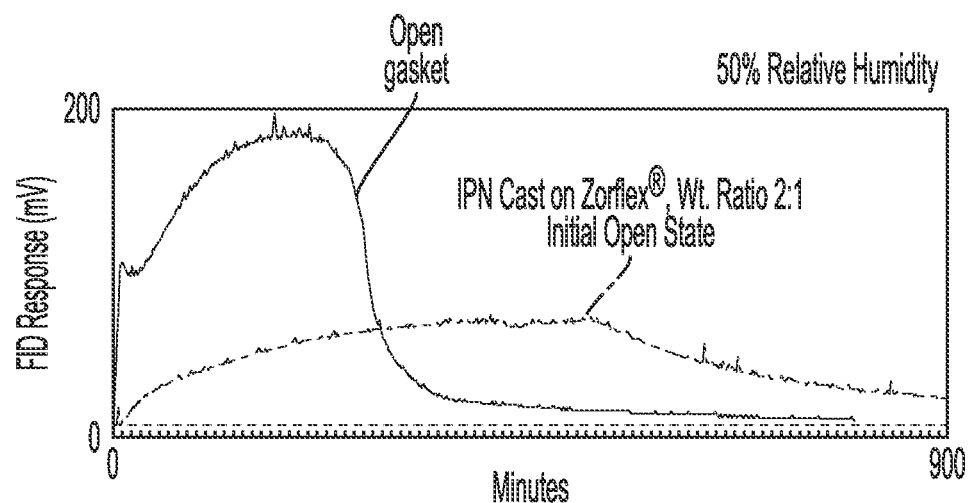
FIG. 23 shows data measured by a flame-ionization detector (FID) for passage of simulant through the cell with no sample present in the gasket (black trace, representing 2.3 mg of simulant vapor), and passage through the open state of the IPN 1—fabric composite.

A standard testing cell for measurement of vapor permeation rates through a solid sample is shown in FIG. 21. The sample, for example a fabric, is attached to a circular metal support that is then placed inside the stainless steel chamber, sealed with a rubber gasket. A small drop of liquid simulant is placed near the sample, and the top of the chamber is then threaded into place. The cell is then mounted to a tubing system that provides a steady stream of nitrogen gas, which is directed past the lower side of the sample. The simulant droplet is permitted to slowly evaporate, and any simulant vapor that passes through the sample is absorbed into the nitrogen stream and carried into a flame-ionization detector (FIG. 22). This allows the amount of simulant that passed through the sample to be quantified as a function of time.

Figure 24:
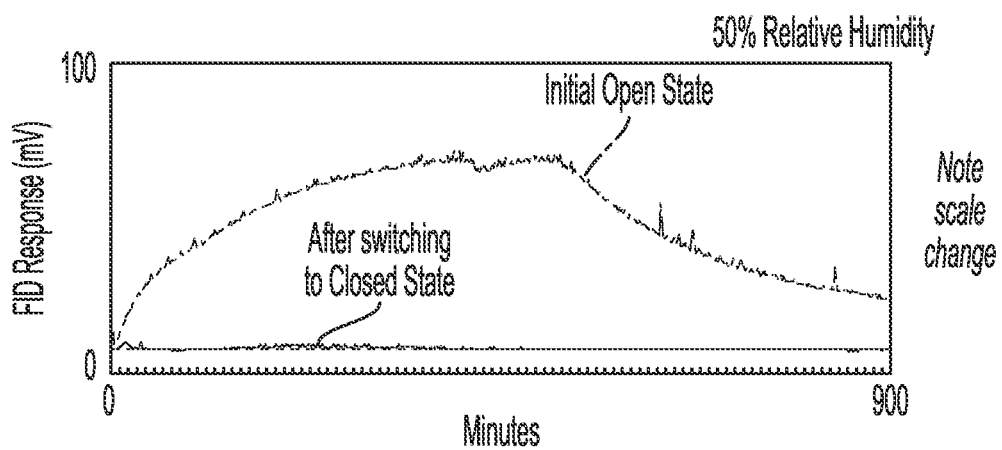
FIG. 24 provides data for passage of the simulant through the open and closed state of the IPN 1—fabric composite.
Figure 25:
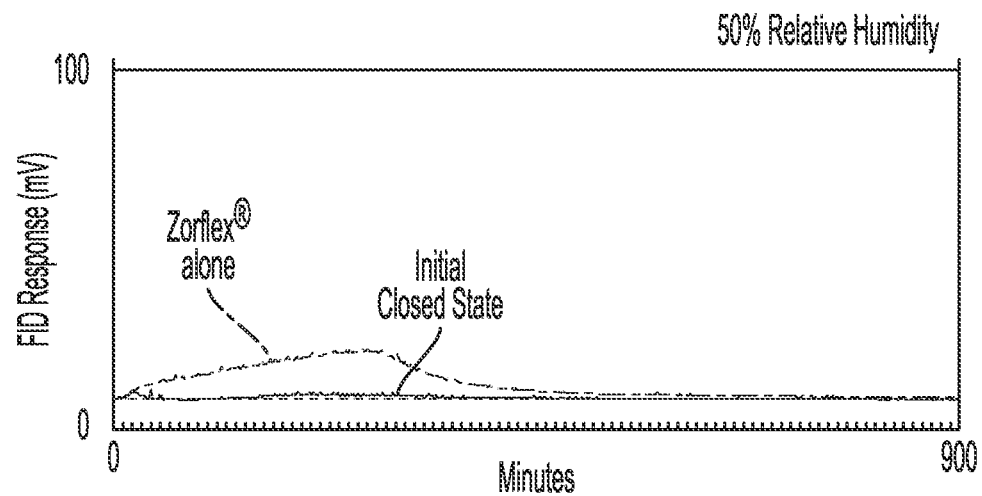
FIG. 25 shows data for simulant passage through the Zorflex® fabric alone, and passage through the IPN 1-fabric composite closed state.
Figure 26:
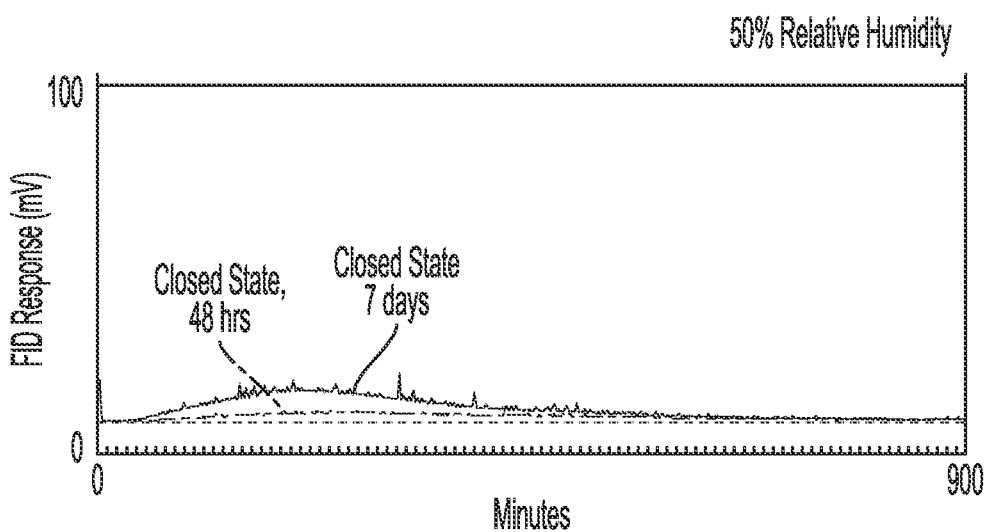
FIG. 26 shows simulant passage through the IPN 1-fabric composite closed state after 48 hours (red) and 7 days (black).
Figure 27:
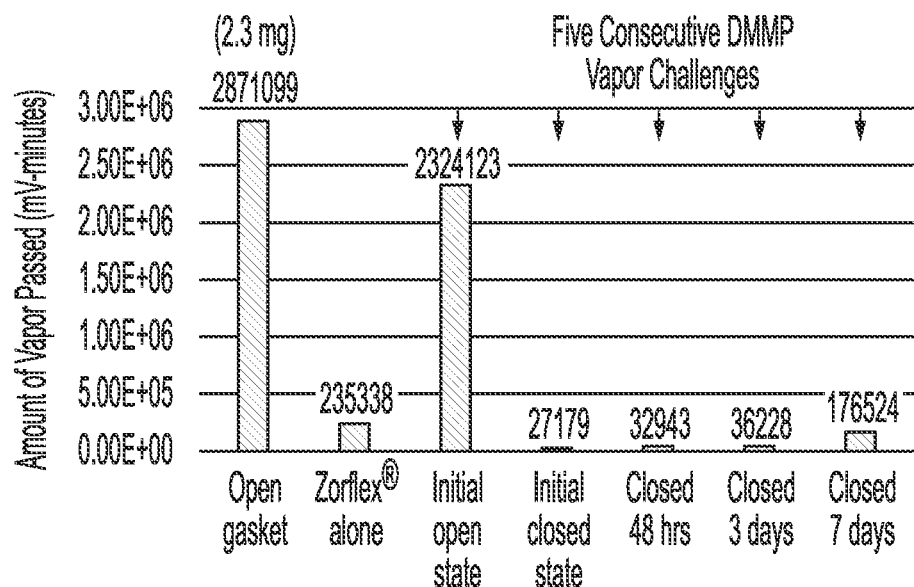
FIG. 27 summarizes the amounts of simulant that were passed by various states of the composite at four time intervals, and the open gasket.

Typical detection vs. time traces for the IPN 1—fabric composite are shown in FIGS. 23-26, for a testing time of 900 minutes at 25° C., using 50% relative humidity in the nitrogen carrier stream. The first plot (FIG. 23) shows the passage of the simulant dimethyl methyl phosphate through the cell with no sample present in the gasket (black trace, representing 2.3 mg of simulant vapor), and passage of the vapor through the open state of IPN 1 supported by the conducting fabric Zorflex® (red trace, see above). Integration of both traces shows that the open state of the IPN-fabric composite allowed passage of 81% of the vapor amount that passes through the open gasket (no vapor present). FIG. 24 depicts the passage of the vapor through the closed state of IPN 1, again supported by the conducting fabric Zorflex®. The closed state was induced by application of a 1.20 volt bias for 120 seconds (see Theory of IPN Electroactuation from Open to Closed State, above). Integration of the traces indicates that the closed state is able to block 98.8% of the vapor that the open state allowed passage for, over a period of 15 hours. Thus, an effective protective closed state demonstrating bistability for at least 15 hours was achieved in the relatively short voltage application time of two minutes. FIG. 25 compares vapor passage through the Zorflex® fabric alone, and passage through the IPN-fabric closed state. Integration of both traces shows that the fabric alone allows passage of 8.7-fold more vapor than the IPN-fabric closed state. This is a clear demonstration that the IPN alone provides most of the protective characteristics of the composite. FIG. 26 shows vapor passage through the IPN-fabric closed state after 48 hours (red) and 7 days (black). Integration of the former shows that the composite still retains a most of its protective ability after the passage of two days, blocking 98.6% of the vapor that was passed by the open state. After 7 days, integration of the trace shows that it was able to block 92.0% of the vapor that was passed by the open state. Thus, the closed, protective state maintains at least 90% bistability for a period of one week after the first exposure to simulant. The bar graph in FIG. 27 depicts a summary of the vapor amounts that that were passed by various states of the composite at four time intervals, and the empty gasket. In can be seen that the closed state composite is able to provide protection even after several challenges from the simulant.

Figure 28:
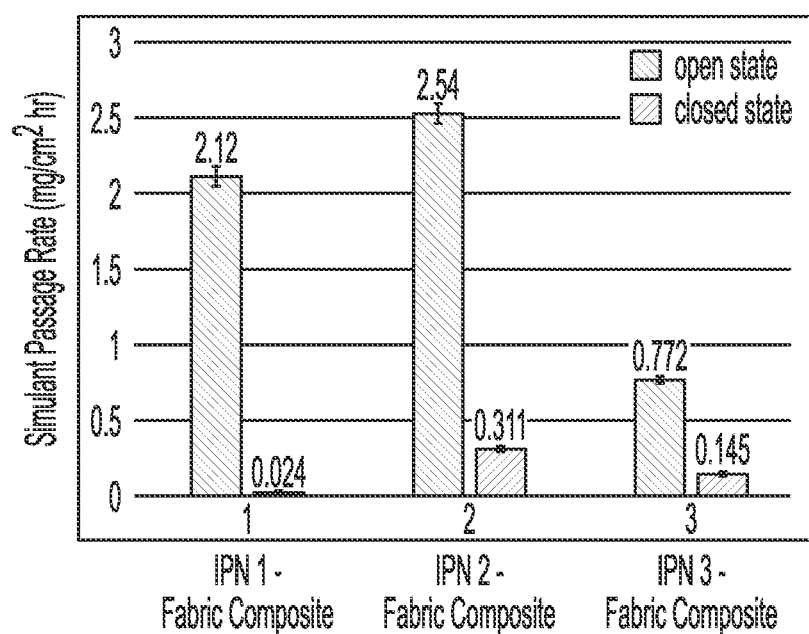
FIG. 28 is a comparison of simulant passage through IPN-fabric composites 1-3.

Similar studies of the open and closed states were conducted with the comparative IPN 2 and IPN 3. Polyester was used as the fabric support for the former, wool was used for the latter. The weight ratio of IPN to fabric was 1:1. The bar graph of FIG. 28 and Tables 1 and 2 demonstrate that IPN 1 has, by far, the most effective closed protective state compared to IPNs 2 and 3. As Table 1 indicates, the ratio of simulant vapor permeation rates through the open vs. closed states is ~10 to 17-fold higher for IPN 1 vs. IPNs 2 and 3. This arises from the highly effective closed state afforded by IPN 1—Table 2 indicates that the closed state of IPN 1 blocks the passage of between 6 and 13-fold more simulant vapor than the closed states of IPNs 2 and 3. Vapor passage rates through the open state of IPN 1 is intermediate to those of IPNs 2 and 3.

TABLE 1

Ratios of simulant permeation rates for the IPN - Fabric Composites

|  | Ratio of Simulant Permeation Rates Open vs. Closed State |
| --- | --- |
| IPN 1 - Fabric Composite | 88.3 |
| IPN 2 - Fabric Composite | 8.16 |
| IPN 3 - Fabric Composite | 5.32 |

TABLE 2

Ratios of simulant permeation rates for the IPN - Fabric Composites

|  | Open State, Ratio of Simulant Permeation Rate vs. IPN 1 - Fabric Composite | Closed State, Ratio of Simulant Permeation Rate vs. IPN 1 - Fabric Composite |
| --- | --- | --- |
| IPN 2 - Fabric Composite | 1.20 | 12.96 |
| IPN 3 - Fabric Composite | 0.364 | 6.04 |

To summarize, for IPN 1 composite demonstrates an effective closed state that is attainable using low to moderate voltages over relatively short times, and its closed state is appears superior to those of the IPN 2 and 3 composites synthesized previously.

Figure 29:
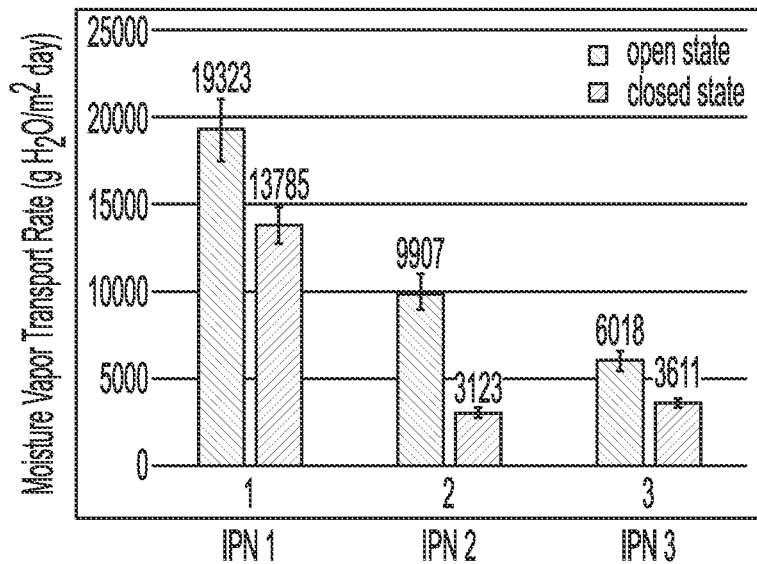
FIG. 29 shows vapor transport rates through IPN-fabric composites at 37° C., 50% relative humidity.
Figure 30:
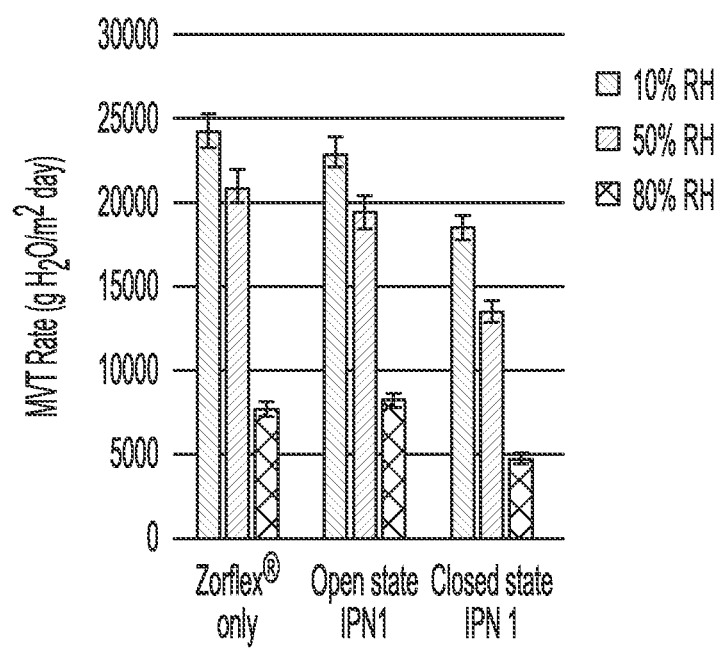
FIG. 30 indicates moisture vapor transport rates through IPN 1-fabric composites at 37° C., as a function of relative humidity.

For the composites to be effective and practical in chemical protection, they not only should demonstrate an effective closed state that is attainable using low to moderate voltages over relatively short times, but they also should demonstrate breathability in terms of high moisture vapor transport (MVT) rates. This is a requirement for the open state, and is desirable in the closed state also. MVT rates were measured by allowing water evaporation to occur through IPN-fabric composite samples that were mounted atop sealed vials containing water. Periodic weighing of the vial indicated weight losses that allowed calculation of the MVT rates through the sample. FIG. 29 depicts a comparison between the three IPN composites, in terms of MVT at 50% relative humidity and 37° C. Clearly, the IPN 1 composite shows superior MVTs, in both the open and closed states. The MVT for the open state is equivalent to commercially available sport clothing. It is a factor of ~2 and ~3 higher than that of the IPN 2 and 3 composites, respectively. It is of interest that the closed state MVT is superior to the open states of IPNs 1 and 2. Thus the IPN 1 composite is the best performer of the three, in terms of both chemical protection and breathability.

Further Embodiments

Figure 31:
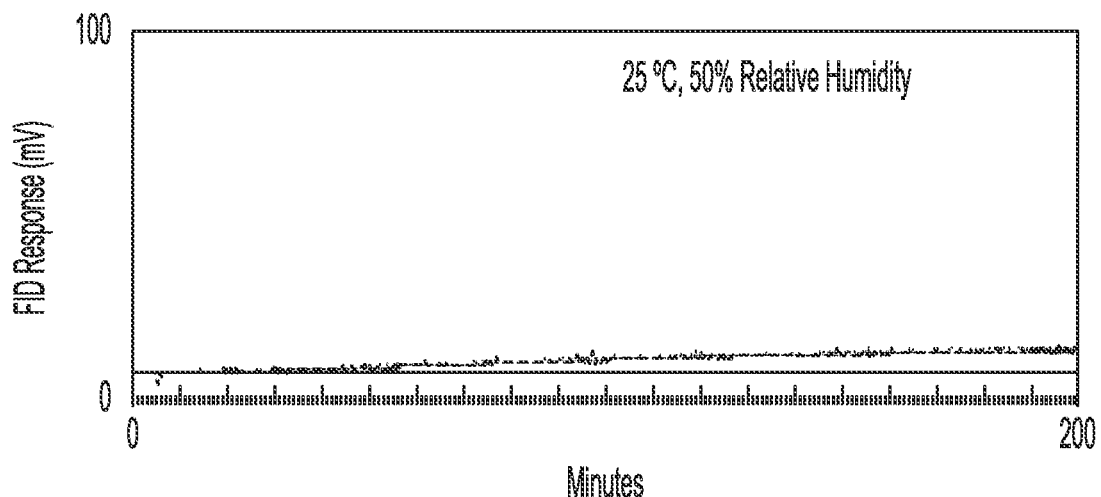
FIG. 31 shows data for vapor passage by the HC-IPN 1-fabric composite.
Figure 32:
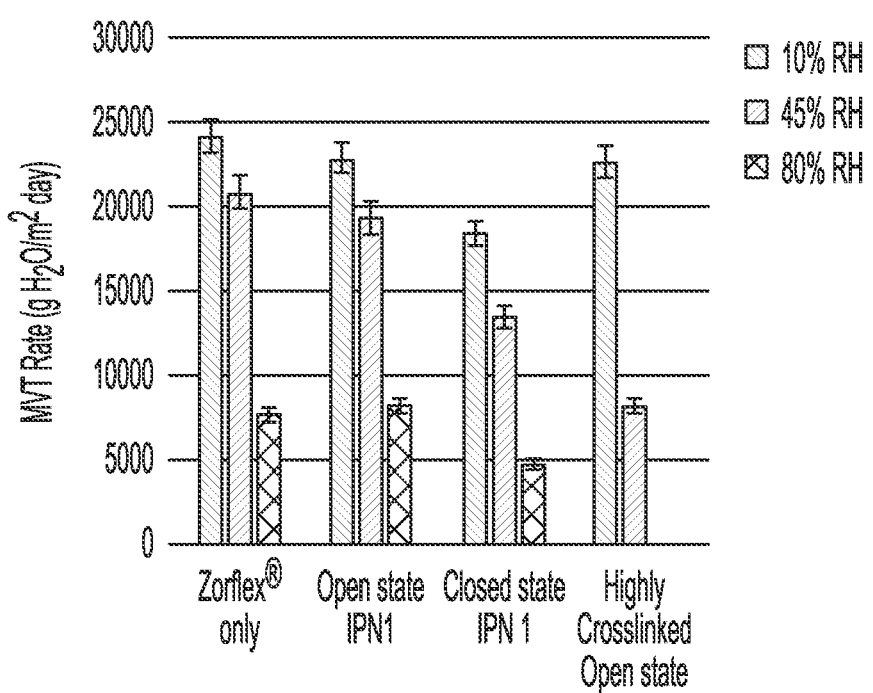
FIG. 32 depicts moisture vapor transport rates through the IPN 1-fabric composites and the HC-IPN 1-fabric composite at 37° C., as a function of relative humidity.

In the formation of IPN 1, increasing the amount of crosslinker substantially (from ~7% to 20% or higher) resulted in a dense IPN network that is not able to be electrically actuated to a bistable closed state using moderate voltage levels (up to ~2.5 volts). This version of IPN 1 in the fabric composite with Zorflex, does however provide a large degree of protection in its open state, and is very stable towards repeated simulant vapor challenges. FIG. 31 depicts the time-dependent simulant vapor passage through this composite, which will be referred to as "highly crosslinked IPN 1-fabric composite", or "HC-IPN 1-fabric composite". It is seen that in its open state it blocks 98.5% of the simulant vapor that passes through the standard IPN 1-fabric composite, over a time period of 200 minutes. The black and red traces represent the first and third vapor challenges the sample was subjected to. It is evident that the HC-IPN 1-fabric composite provides a very high degree of protection when in its open state, and can withstand multiple vapor challenges without a lessening of performance. FIG. 32 shows the MVT rates that HC-IPN 1-fabric composite demonstrated, compared to the standard IPN 1-fabric composite in its open and closed states, and Zorflex® alone. At low relative humidity the HC-IPN 1-fabric composite is able to support very high MVT, but at moderate relative humidity the rate decreases to about one half of that of the standard IPN 1-fabric composite. Thus the open state of the former provides a large amount of chemical protection, but with the tradeoff of having lower MVT rates at higher relative humidity. Nonetheless, the HC-IPN 1-fabric composite may be useful in certain protection applications, and it has the advantage of not requiring a power source for electroactuation to the closed state.

In further studies it was found that use of higher voltages for electroactuation (less than 10 volts) can in fact lead to closed states for these materials, and for other forms of the IPN that also have a relatively high density (data not shown).

Moreover, for related versions of the IPN one may envision (1) increasing the molecular weight of the conducting polymer chains, which may lead to a denser IPN structure, and/or (2) increasing the length of the charged tethers on the conducting polymer chain, which may lead to higher MVT rates. Also, other types of ionic liquids may be used, which may increase the composite conductivity or lessen the amount of power required to transform the composite into its closed state.

Contemplated uses for IPN include protective garments (including protective masks, headgear, gloves, etc.), filters for gas and/or liquid, and shelters including temporary shelters.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

References

U.S. Pat. No. 8,940,173 B2, O. Bakajin et al, Jan. 27, 2015—"Membranes with Functionalized Carbon Nanotubes for Selective Transport".

U.S. Pat. No. 9,095,821 B1, T. V. Ratto et al, Aug. 4, 2015—"Non-Reactive Process for Fixing Nanotubes in a Membrane in a Through Passage Orientation"

"An Elastomeric Poly(Thiophene-EDOT) Composite with a Dynamically Variable Permeability Towards Organic Vapors," B. D. Martin et al, Adv. Funct. Mater. (2012) 22, 3116-3127.

What is claimed is:

1. A fabric comprising an interpenetrating polymer network comprising net-poly(3-{2-[2-(2-{2-[(thiophene-3-carbonyl)-amino]-ethoxy}-ethoxy)-ethoxy]-ethoxy}-propane-1-sulfonic acid)-co-5, 5 bis-3,4 ethylenedioxythiophene-co-hydroxymethyl-3,4 ethylenedioxythiophene-co-(net-(poly(propylene glycol-tolylene 2,4 diisocyanate)))-ipn-(polyurethane).

2. A construction of fabric, wherein the construction is a protective garment, a filter, or a shelter and the fabric comprises an interpenetrating polymer network comprising poly(3-{2-[2-(2-{2-[(thiophene-3-carbonyl)-amino]-ethoxy}-ethoxy)-ethoxy]-ethoxy}-propane-1-sulfonic acid)-co-5, 5 bis-3,4 ethylenedioxythiophene-co-hydroxymethyl-3,4 ethylenedioxythiophene-co-(net-(poly(propylene glycol-tolylene 2,4 diisocyanate)))-ipn-(polyurethane).

* * * * *